(12) United States Patent
Johnston et al.

(10) Patent No.: US 11,710,987 B2
(45) Date of Patent: **\*Jul. 25, 2023**

(54) SYSTEMS AND METHODS FOR DETECTING WIRELESS POWER RECEIVERS AND OTHER OBJECTS AT A NEAR-FIELD CHARGING PAD

(71) Applicant: Energous Corporation, San Jose, CA (US)

(72) Inventors: Cesar Johnston, Sunnyvale, CA (US); Deepak Jain, San Ramon, CA (US); Erik Heinke, San Jose, CA (US); Alister Hosseini, Phoenix, AZ (US); Sean Nicolson, Irvine, CA (US)

(73) Assignee: Energous Corporation, San Jose, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 16/841,612

(22) Filed: Apr. 6, 2020

(65) Prior Publication Data

US 2020/0244111 A1 Jul. 30, 2020

Related U.S. Application Data

(63) Continuation of application No. 16/045,637, filed on Jul. 25, 2018, now Pat. No. 10,615,647, which is a (Continued)

(51) Int. Cl.
*H02J 50/60* (2016.01)
*H04B 5/00* (2006.01)
(Continued)

(52) U.S. Cl.
CPC ............. *H02J 50/60* (2016.02); *H02J 50/05* (2016.02); *H02J 50/20* (2016.02); *H02J 50/80* (2016.02);
(Continued)

(58) Field of Classification Search
CPC ............. H02J 50/20; H02J 50/23; H02J 50/27
See application file for complete search history.

(56) References Cited

U.S. PATENT DOCUMENTS

| 787,412 A | 4/1905 | Tesla |
|---|---|---|
| 3,167,775 A | 1/1965 | Guertler |
| | (Continued) | |

FOREIGN PATENT DOCUMENTS

| CN | 101496222 A | 7/2009 |
|---|---|---|
| CN | 102089952 A | 6/2011 |
| | (Continued) | |

OTHER PUBLICATIONS

Energous Corp., IPRP, PCT/US2014/037072, Nov. 10, 2015, 6 pgs.
(Continued)

*Primary Examiner* — David V Henze-Gongola
(74) *Attorney, Agent, or Firm* — Morgan, Lewis & Bockius LLP

(57) ABSTRACT

An example method is performed at a near-field charging pad with a processor, a power-transferring element, a signature-signal-receiving circuit, and the processor of the near-field charging pad is in communication with a data source that includes predefined signature signals that each identify one of (i) a wireless power receiver, (ii) an object other than a wireless power receiver, and (iii) a combination of a wireless power receiver and an object other than a wireless power receiver. The method includes: after sending a plurality of test radio frequency (RF) power transmission signals, detecting, using the signature-signal-receiving circuit, respective amounts of reflected power; generating, based on variations in the respective amounts of reflected power, a signature signal; and determining whether (i) an authorized wireless power receiver is present on the near-
(Continued)

field charging pad and/or (ii) an object other than a wireless power receiver is present on the near-field charging pad.

36 Claims, 22 Drawing Sheets

Related U.S. Application Data continuation of application No. 16/024,640, filed on Jun. 29, 2018, now abandoned.

(60) Provisional application No. 62/625,906, filed on Feb. 2, 2018.

(51) Int. Cl.
  *H04B 17/24* (2015.01)
  *H04B 17/29* (2015.01)
  *H04B 17/21* (2015.01)
  *H02J 50/80* (2016.01)
  *H02J 50/05* (2016.01)
  *H02J 50/20* (2016.01)
  *H02J 50/40* (2016.01)

(52) U.S. Cl.
  CPC ........... *H04B 5/0025* (2013.01); *H04B 17/21* (2015.01); *H04B 17/24* (2015.01); *H04B 17/29* (2015.01); *H02J 50/402* (2020.01)

(56) References Cited

U.S. PATENT DOCUMENTS

| | | | |
|---|---|---|---|
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,663,555 B2 | 2/2010 | Caimi et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |

(56) References Cited

U.S. PATENT DOCUMENTS

| | | |
|---|---|---|
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,172 B1 | 10/2017 | Leabman |
| 9,806,564 B2 | 10/2017 | Leabman |
| 9,819,230 B2 | 11/2017 | Petras et al. |
| 9,825,674 B1 | 11/2017 | Leabman |
| 9,843,229 B2 | 12/2017 | Leabman |
| 9,847,669 B2 | 12/2017 | Leabman |
| 9,847,677 B1 | 12/2017 | Leabman |
| 9,853,361 B2 | 12/2017 | Chen et al. |
| 9,853,692 B1 | 12/2017 | Bell et al. |
| 9,859,758 B1 | 1/2018 | Leabman |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,882,394 B1 | 1/2018 | Bell et al. |
| 9,887,584 B1 | 2/2018 | Bell et al. |
| 9,893,555 B1 | 2/2018 | Leabman et al. |
| 9,893,564 B2 | 2/2018 | de Rochemont |
| 9,899,844 B1 | 2/2018 | Bell et al. |
| 9,899,861 B1 | 2/2018 | Leabman et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,068,703 B1 | 9/2018 | Contopanagos |
| 10,075,008 B1 | 9/2018 | Bell et al. |
| 10,079,515 B2 | 9/2018 | Hosseini et al. |
| 10,090,699 B1 | 10/2018 | Leabman |
| 10,090,886 B1 | 10/2018 | Bell et al. |
| 10,103,552 B1 | 10/2018 | Leabman et al. |
| 10,122,219 B1 | 11/2018 | Hosseini et al. |
| 10,124,754 B1 | 11/2018 | Leabman |
| 10,128,686 B1 | 11/2018 | Leabman et al. |
| 10,134,260 B1 | 11/2018 | Bell et al. |
| 10,135,112 B1 | 11/2018 | Hosseini |
| 10,135,294 B1 | 11/2018 | Leabman |
| 10,141,771 B1 | 11/2018 | Hosseini et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,181,756 B2 | 1/2019 | Bae et al. |
| 10,186,892 B2 | 1/2019 | Hosseini et al. |
| 10,193,396 B1 | 1/2019 | Bell et al. |
| 10,199,835 B2 | 2/2019 | Bell |
| 10,199,849 B1 | 2/2019 | Bell |
| 10,205,239 B1 | 2/2019 | Contopanagos et al. |

(56) References Cited

U.S. PATENT DOCUMENTS

| | | |
|---|---|---|
| 10,211,674 B1 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,277,054 B2 | 4/2019 | Hosseini |
| 10,291,055 B1 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,192 B1 | 5/2019 | Rappaport |
| 10,305,315 B2 | 5/2019 | Leabman et al. |
| 10,312,715 B2 | 6/2019 | Leabman |
| 10,320,446 B2 | 6/2019 | Hosseini |
| 10,355,534 B2 | 7/2019 | Johnston et al. |
| 10,447,093 B2 | 10/2019 | Hosseini |
| 10,476,312 B2 | 11/2019 | Johnston et al. |
| 10,615,647 B2 | 4/2020 | Johnston et al. |
| 10,879,740 B2 | 12/2020 | Hosseini |
| 10,985,617 B1 | 4/2021 | Johnston et al. |
| 11,451,096 B2 | 9/2022 | Hoss |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1* | 10/2007 | Stevens .................. H02J 50/80 307/45 |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |

(56) References Cited

U.S. PATENT DOCUMENTS

| | | |
|---|---|---|
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |

(56) References Cited

U.S. PATENT DOCUMENTS

| | | |
|---|---|---|
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aioi et al. |
| 2011/0148595 A1 | 6/2011 | Miller et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |

(56) References Cited

U.S. PATENT DOCUMENTS

| | | |
|---|---|---|
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 * | 10/2013 | Miwa ............... H04B 5/0037 307/104 |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001608 A1 | 1/2014 | McPartlin |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0024325 A1 | 1/2014 | Iun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159646 A1 | 6/2014 | Sankar et al. |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |

(56) References Cited

U.S. PATENT DOCUMENTS

| | | |
|---|---|---|
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326051 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326071 A1 | 11/2015 | Contopanagos |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |

(56) References Cited

U.S. PATENT DOCUMENTS

| | | |
|---|---|---|
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013661 A1 | 1/2016 | Kurs et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094074 A1 | 3/2016 | Alves et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0112787 A1 | 4/2016 | Rich |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0174293 A1 | 6/2016 | Mow et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0202343 A1 | 7/2016 | Okutsu |
| 2016/0204622 A1 | 7/2016 | Leabman |
| 2016/0204642 A1 | 7/2016 | Oh |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0187225 A1 | 2/2017 | Hosseini |
| 2017/0063168 A1 | 3/2017 | Uchida |
| 2017/0077733 A1 | 3/2017 | Jeong et al. |
| 2017/0077735 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085127 A1 | 3/2017 | Leabman |
| 2017/0085437 A1 | 3/2017 | Condeixa et al. |
| 2017/0092115 A1 | 3/2017 | Sloo et al. |
| 2017/0110888 A1 | 4/2017 | Leabman |
| 2017/0110889 A1 | 4/2017 | Bell |
| 2017/0110910 A1 | 4/2017 | Zeine et al. |
| 2017/0110914 A1 | 4/2017 | Bell |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1* | 5/2017 | Adolf ............... H04B 5/0037 |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0179771 A1 | 6/2017 | Leabman |
| 2017/0187198 A1 | 6/2017 | Leabman |
| 2017/0187222 A1 | 6/2017 | Hosseini |
| 2017/0187223 A1 | 6/2017 | Hosseini |
| 2017/0187228 A1 | 6/2017 | Hosseini |
| 2017/0187248 A1 | 6/2017 | Leabman |
| 2017/0187422 A1 | 6/2017 | Hosseini |
| 2017/0212210 A1 | 7/2017 | Chen et al. |
| 2017/0214422 A1 | 7/2017 | Na et al. |
| 2017/0338695 A1 | 11/2017 | Port |
| 2018/0006611 A1 | 1/2018 | de Jong et al. |
| 2018/0040929 A1 | 2/2018 | Chappelle |
| 2018/0048178 A1 | 2/2018 | Leabman |
| 2018/0123400 A1 | 5/2018 | Leabman |
| 2018/0131238 A1 | 5/2018 | Leabman |
| 2018/0159355 A1 | 6/2018 | Leabman |
| 2018/0166924 A1 | 6/2018 | Hosseini |
| 2018/0166925 A1 | 6/2018 | Hosseini |
| 2018/0226840 A1 | 8/2018 | Leabman |
| 2018/0227018 A1 | 8/2018 | Moshfeghi |
| 2018/0241255 A1 | 8/2018 | Leabman |
| 2018/0262040 A1 | 9/2018 | Contopanagos |
| 2018/0262060 A1 | 9/2018 | Johnston |
| 2018/0287431 A1 | 10/2018 | Liu et al. |
| 2018/0301934 A1 | 10/2018 | Prabhala et al. |
| 2018/0368065 A1 | 12/2018 | Sarkas et al. |
| 2018/0375340 A1 | 12/2018 | Bell et al. |
| 2018/0376235 A1 | 12/2018 | Leabman |
| 2019/0074728 A1 | 3/2019 | Leabman |
| 2019/0074862 A1 | 3/2019 | Wang et al. |
| 2019/0089396 A1 | 3/2019 | Kim et al. |
| 2019/0131827 A1 | 5/2019 | Johnston |
| 2019/0245389 A1 | 8/2019 | Johnston et al. |
| 2019/0326782 A1 | 10/2019 | Graham et al. |
| 2019/0386522 A1 | 12/2019 | Park et al. |
| 2020/0052408 A1 | 2/2020 | Rappaport |
| 2020/0091608 A1 | 3/2020 | Alpman et al. |
| 2020/0119592 A1 | 4/2020 | Hosseini |
| 2020/0176890 A1 | 6/2020 | Rappaport et al. |
| 2020/0235614 A1 | 7/2020 | Swan et al. |
| 2020/0274397 A1 | 8/2020 | Hwang et al. |

(56) References Cited

U.S. PATENT DOCUMENTS

| | | | |
|---|---|---|---|
| 2021/0098882 A1 | 4/2021 | Paulotto et al. | |
| 2021/0296936 A1 | 9/2021 | Hosseini | |
| 2023/0057092 A1 | 2/2023 | Hoss | |

FOREIGN PATENT DOCUMENTS

| | | |
|---|---|---|
| CN | 102292896 A | 12/2011 |
| CN | 102860037 A | 1/2013 |
| CN | 203826555 U | 9/2014 |
| CN | 104090265 A | 10/2014 |
| CN | 104617680 A | 5/2015 |
| CN | 105207373 A | 12/2015 |
| CN | 105765821 A | 7/2016 |
| CN | 103380561 B | 9/2017 |
| DE | 20016655 U1 | 2/2002 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 3067983 A1 | 9/2016 |
| EP | 3118970 A1 | 1/2017 |
| EP | 3145052 A1 | 3/2017 |
| GB | 2404497 A | 2/2005 |
| JP | 2002319816 A | 10/2002 |
| JP | 2006157586 A | 6/2006 |
| JP | 2006178910 A | 7/2006 |
| JP | 2007043432 A | 2/2007 |
| JP | 2008167017 A | 7/2008 |
| JP | 2009525715 A | 7/2009 |
| JP | 2009201328 A | 9/2009 |
| JP | 2010104098 A | 5/2010 |
| JP | 2012095226 A | 5/2012 |
| JP | 2013500693 A | 1/2013 |
| JP | 2013511908 A | 4/2013 |
| JP | 2013099249 A | 5/2013 |
| JP | 2013162624 A | 8/2013 |
| JP | 2015128349 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140025410 A | 3/2014 |
| KR | 20140085200 A | 7/2014 |
| KR | 20140148270 A | 12/2014 |
| KR | 20150077678 A | 7/2015 |
| KR | 20160018826 A | 2/2016 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |

OTHER PUBLICATIONS

Energous Corp., IPRP, PCT/US2014/037109, Apr. 12, 2016, 9 pgs.
Energous Corp., IPRP, PCT/US2014/037170, Nov. 10, 2015, 8 pgs.
Energous Corp., IPRP, PCT/US2014/040648, Dec. 8, 2015, 8 pgs.
Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/041323, Dec. 22, 2015, 8 pgs.
Energous Corp., IPRP, PCT/US2014/041342, Dec. 15, 2015, 8 pgs.
Energous Corp., IPRP, PCT/US2014/041534, Dec. 29, 2015, 7 pgs.
Energous Corp., IPRP, PCT/US2014/041546, Dec. 29, 2015, 9 pgs.
Energous Corp., IPRP, PCT/US2014/041558, Dec. 29, 2015, 6 pgs.
Energous Corp., IPRP, PCT/US2014/044810, Jan. 5, 2016, 10 pgs.
Energous Corp., IPRP, PCT/US2014/045102, Jan. 12, 2016, 11 pgs.
Energous Corp., IPRP, PCT/US2014/045119, Jan. 12, 2016, 9 pgs.
Energous Corp., IPRP, PCT/US2014/045237, Jan. 12, 2016, 12 pgs.
Energous Corp., IPRP, PCT/US2014/046941, Jan. 19, 2016, 9 pgs.
Energous Corp., IPRP, PCT/US2014/046956, Jan. 19, 2016, 7 pgs.
Energous Corp., IPRP, PCT/US2014/046961, Jan. 19, 2016, 8 pgs.
Energous Corp., IPRP, PCT/US2014/047963, Jan. 26, 2016, 10 pgs.
Energous Corp., IPRP, PCT/US2014/048002, Feb. 12, 2015 8 pgs.
Energous Corp., IPRP, PCT/US2014/049666, Feb. 9, 2016, 5 pgs.
Energous Corp., IPRP, PCT/US2014/049669, Feb. 9, 2016, 8 pgs.
Energous Corp., IPRP, PCT/US2014/049673, Feb. 9, 2016, 6 pgs.
Energous Corp., IPRP, PCT/US2014/054891, Mar. 15, 2016, 10 pgs.
Energous Corp., IPRP, PCT/US2014/054897, Mar. 15, 2016, 8 pgs.
Energous Corp., IPRP, PCT/US2014/054953, Mar. 22, 2016, 5 pgs.
Energous Corp., IPRP, PCT/US2014/055195, Mar. 22, 2016, 9 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/062672, May 10, 2016, 8 pgs.
Energous Corp., IPRP, PCT/US2014/062682, May 3, 2016, 8 pgs.
Energous Corp., IPRP, PCT/US2014/068282, Jun. 7, 2016, 10 pgs.
Energous Corp., IPRP, PCT/US2014/068568, Jun. 14, 2016, 8 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 26, 2018, 6 pgs.
Energous Corp., IPRP, PCT/US2016/068504, Jun. 26, 2018, 5 pgs.
Energous Corp., IPRP, PCT/US2016/068551, Jun. 26, 2018, 6 pgs.
Energous Corp., IPRP, PCT/US2016/068565, Jun. 26, 2018, 9 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2016/069313, Jul. 3, 2018, 7 pgs.

(56) References Cited

OTHER PUBLICATIONS

Energous Corp., IPRP, PCT/US2016/069316, Jul. 3, 2018, 12 pgs.
Energous Corp., IPRP, PCT/US2017/046800, Feb. 12, 2019, 10 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Extended European Search Report, EP14818136.5, dated Jul. 21, 2016, 9 pgs.

(56) References Cited

OTHER PUBLICATIONS

Extended European Search Report, EP14822971.9, dated Feb. 10, 2017, 10 pgs.
Extended European Search Report, EP14868901.1, dated Jul. 17, 2017, 6 pgs.
Extended European Search Report, EP15874273.4, dated May 11, 2018, 7 pgs.
Extended European Search Report, EP15876033.0, dated Jun. 13, 2018, 10 pgs.
Extended European Search Report, EP15876036.3, dated May 3, 2018, 9 pgs.
Extended European Search Report, EP15876043.9, dated Aug. 9, 2018, 9 pgs.
Extended European Search Report, EP16189052.0, dated Feb. 10, 2017, 13 pgs.
Extended European Search Report, EP16189300.3, dated Mar. 24, 2017, 6 pgs.
Extended European Search Report, EP16189319.3, dated Feb. 10, 2017, 11 pgs.
Extended European Search Report, EP16189974.5, dated Mar. 13, 2017, 7 pgs.
Extended European Search Report, EP16189982.8, dated Feb. 7, 2017, 11 pgs.
Extended European Search Report, EP16189987.7, dated Feb. 9, 2017, 10 pgs.
Extended European Search Report, EP16189988.5, dated Mar. 13, 2017, 6 pgs.
Extended European Search Report, EP16193743.8, dated Feb. 8, 2017, 9 pgs.
Extended European Search Report, EP16196205.5, dated Apr. 7, 2017, 9 pgs.
Extended European Search Report, EP16880153.8, dated Jul. 2, 2019, 9 pgs.
Extended European Search Report, EP18204043.6, dated Feb. 14, 2019, 5 pgs.
Notice of Intent to Issue Reexam Certificate: 90/013,793 dated Feb. 2, 2017, 8 pgs.
Order Granting Reexamination Request, U.S. Appl. No. 90/013,793 dated Aug. 31, 2016, 23 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
Adamiuk et al. "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al. "A System for Change Detection and Human Recognition in Voxel Space using the Microsoft Kinect Sensor," 2011 IEEE Applied Imagery Pattern Recognition Workshop. 8 pgs.
Han et al. Enhanced Computer Vision with Microsoft Kinect Sensor: A Review, IEEE Transactions on Cybernetics vol. 43, No. 5, pp. 1318-1334, Oct. 3, 2013.
Hsieh et al. "Development of a Retrodirective Wireless Microwave Power Transmission System", IEEE, 2003 pp. 393-396.
Leabman "Adaptive Band-partitioning for Interference Cancellation in Communication System," Thesis Massachusetts Institute of Technology, Feb. 1997, pp. 1-70.
Li et al. High-Efficiency Switching-Mode Charger System Design Considerations with Dynamic Power Path Management, Mar./Apr. 2012 Issue, 8 pgs.
Mao et al. "BeamStar: An Edge-Based Approach to Routing in Wireless Sensors Networks", IEEE Transactions on Mobile Computing, IEEE Service Center, Los Alamitos, CA US, vol. 6, No. 11, Nov. 1, 2007, 13 pgs.
Mascarenas et al. "Experimental Studies of Using Wireless Energy Transmission for Powering Embedded Sensor Nodes," Nov. 28, 2009, Journal of Sound and Vibration, 13 pgs.
Mishra et al. "SIW-based Slot Array Antenna and Power Management Circuit for Wireless Energy Harvesting Applications", IEEE APSURSI, Jul. 2012, 2 pgs.
Nenzi et al. "U-Helix: On-Chip Short Conical Antenna", 2013 7th European Conference on Antennas and Propagation (EUCAP), ISBN:978-1-4673-2187-7, IEEE, Apr. 8, 2013, 5 pgs.
Singh "Wireless Power Transfer Using Metamaterial Bonded Microstrip Antenna for Smart Grid WSN", Fourth International Conference on Advances in Computing and Communications (ICACC), Aug. 27-29, 2014, Abstract 1 pg.
Smolders "Broadband Microstrip Array Antennas" Institute of Electrical 1-15 and Electronics Engineers, Digest of the Antennas and Propagation Society International Symposium, Seattle, WA, Jun. 19-24, 1994, Abstract 3 pgs.
Van Veen et al., "Beamforming: A Versatile Approach to Spatial Filtering", IEEE, ASSP Magazine, Apr. 1988, pp. 4-24.
Zhai et al. "A Practical Wireless Charging System Based On Ultra-Wideband Retro-Reflective Beamforming" 2010 IEEE Antennas and Propagation Society International Symposium, Toronto, ON 2010, 4 pgs.
Energous Corp., IPRP, PCT/US2017/065886, Jun. 18, 2019, 10 pgs.
Energous Corp., IPRP, PCT/US2018/064289, Dec. 29, 2020, 8 pgs.
Energous Corp., IPRP, PCT/US2019/015820, Aug. 4, 2020, 7 pgs.
Energous Corp., IPRP, PCT/US2020/067566, Jul. 5, 2022, 8 pgs.
Energous Corp., ISRWO, PCT/US2018/064289, Apr. 25, 2019, 12 pgs.
Energous Corp., ISRWO, PCT/US2020/067566, Apr. 27, 2021, 12 pgs.
Extended European Search Report, EP17882087.4, dated Sep. 17, 2019, 10 pgs.

* cited by examiner

SYSTEMS AND METHODS FOR DETECTING WIRELESS POWER RECEIVERS AND OTHER OBJECTS AT A NEAR-FIELD CHARGING PAD

RELATED APPLICATIONS

This application is a continuation of U.S. patent application Ser. No. 16/045,637, filed Jul. 25, 2018 entitled "Systems And Methods For Detecting Wireless Power Receivers And Other Objects At A Near-Field Charging Pad," which is a continuation of U.S. patent application Ser. No. 16/024,640, filed Jun. 29, 2018 entitled "Systems and Methods for Detecting Wireless Power Receivers and Other Objects at a Near-Field Charging Pad," which claims priority to U.S. Provisional Application No. 62/625,906, filed Feb. 2, 2018, entitled "Systems and Methods for Detecting Wireless Power Receivers and Other Objects at a Near-Field Charging Pad," all of which are hereby incorporated by reference in their entirety.

The present application is related to U.S. patent application Ser. No. 15/424,552, and Ser. Nos. 15/833,790, 15/943,559, 15/963,959, and to PCT Application No. PCT/US17/65886, and each of these related applications is hereby incorporated by reference in its respective entirety.

TECHNICAL FIELD

The embodiments herein generally relate to antennas, software, and devices used in wireless power transmission systems and, more specifically, to a near-field charging pad that is able to detect wireless power receivers and other types of objects using a signature-signal receiving circuit.

BACKGROUND

Conventional charging pads utilize induction to generate a magnetic field that is used to charge a device. Users have encountered numerous frustrating issues with these conventional charging pads, including having damage caused to objects that include magnetic strips and/or RFID chips (e.g., credits cards, security badges, passports, key fobs, and the like). Moreover, many of these conventional pads typically require placing the device to be charged at a specific position on the charging pad, and the device may not be moved to different positions on the pad, without interrupting or terminating the charging of the device. This results in a frustrating experience for many users as they may be unable to locate the device at the exact right position on the pad in which to start charging their device, and may further end up with damage to important objects that they use on a daily basis.

SUMMARY

Accordingly, there is a need for wireless charging systems (e.g., radio frequency (RF) charging pads) that address the problems identified above. To this end, an RF charging pad is described herein that is capable of detecting whether an authorized wireless power receiver is located on the pad, and whether any other objects (which are not wireless power receivers) are located on the pad. Such systems and methods of use thereof help to discover presence of objects on the pad in order to determine whether to proceed with delivery of wireless power or whether to forgo transmitting wireless power in order to avoid potentially damaging any of the detected objects. The pad is also able to identify authorized wireless power receivers and/or ignore one or more wireless power receivers that are not authorized to be charged or powered by the RF charging pad and, thereby, avoid power leeching and other drains on the system as a whole, while ensuring that authorized wireless power receivers always receive power.

In some instances, the RF charging pad transmits test power transmission signals and then receives reflected power back from one or more wireless power receivers or from one or more objects (which are not wireless power receivers) that are present on the RF charging pad. The reflected power can be collected and analyzed to identify signature signals and to thereby determine whether an authorized device is present and/or also whether an object other than a wireless power receiver is present (as is explained in more detail below). In some embodiments, the process for reflecting power works even if an authorized wireless power receiver has no power remaining (e.g., its battery is completely drained), as the wireless power receiver is able to harness energy from the test power transmission signals to create impedance changes at the receiver side, which then cause different amounts of reflected power to be detected at the RF charging pad (and within different power-transfer zones thereof), thereby allowing the receiver to convey data to the RF charging pad.

As mentioned above, such systems and methods could further manage power transfer control communication between the RF charging pad and one or more wireless power receivers with or without any data-communication capability. In some instances, the wireless power receiver may comprise an electronic device, circuitry for receiving and converting wireless power transmission signals, and a data-communication radio, and the electronic device's battery may have no charge (or power) remaining, so the device is unable to send a data-communication signal to the pad. In this scenario, a different technique is needed to detect whether the wireless power receiver is authorized to receive wireless power or not. In other instances, the wireless power receiver may comprise an electronic device and circuitry for receiving and converting wireless power transmission signals, and may not include any data-communication radio, and thus a technique is needed to be able to determine whether such receivers are authorized to receive wireless power from the pad. The various embodiments discussed herein provide techniques that solve these problems.

In the description that follows, references are made to an RF charging pad that includes various antenna zones. For the purposes of this description, power-transfer (or antenna) zones include one or more power-transferring elements (e.g., antennas such as a capacitive coupler) of the RF charging pad, and each power-transfer zone may be individually addressable by a controlling integrated circuit (e.g., RF power transmitter integrated circuit 160, FIGS. 1A-1B) to allow for selective activation of each power-transfer zone in order to determine which power-transfer zone is able to most efficiently transfer wireless power to a receiver. The RF charging pad is also inter-changeably referred to herein as a near-field charging pad, or, more simply, as a charging pad.

(A1) In some embodiments, a method is performed at a near-field charging pad that includes a wireless communication component (e.g., communication component 204, FIG. 1A), a plurality of power-transfer zones that each respectively include at least one power-transferring element (e.g., example power-transfer zones are shown in FIG. 1B) and a signature-signal receiving circuit (e.g., circuit 240, FIG. 3A), and one or more processors (e.g., CPU 202, FIGS. 1B and 2A). The method includes: sending, by a respective power-transferring element included in a first power-transfer zone of the plurality of power-transfer zones, a plurality of test power transmission signals with first values for a first set of transmission characteristics. The method also includes: in conjunction with sending each of the plurality of test power transmission signals, detecting, using the signature-signal receiving circuit, respective amounts of reflected power at the first power-transfer zone. The method further includes: based at least in part on the respective amounts of reflected power, determining whether (i) an authorized wireless power receiver and/or (ii) an object other than a wireless power receiver is present on a surface of the near-field charging pad that is adjacent to the first power-transfer zone.

(A2) In some embodiments of the method of A1, the detecting the respective amounts of reflected power at the first power-transfer zone includes determining, using the signature-signal receiving circuit, one or more signature signals that are based at least in part on the respective amounts of reflected power at the first power-transfer zone. The method also further includes: determining, based on a comparison of the one or more signature signals with one or more predefined signature signals, that an authorized wireless power receiver is present on the surface of the near-field charging pad that is adjacent to the first antenna zone. In some embodiments, the authorized wireless power receiver includes a signature-signal generating circuit that uses power harvested from the plurality of test power transmission signals to generate the one or more signature signals; and in accordance with the determining that the authorized wireless power receiver is present on the surface, transmitting, by the respective power-transferring element included in the first antenna zone, additional power transmission signals with second values for the first set of transmission characteristics. In some embodiments, the signature-signal receiving circuit is configured to detect measurements of reflected power at the first antenna zone and these measurements may change based on presence or absence of objects on a surface adjacent to the first antenna zone (e.g., a surface of the pad that is immediately above the first antenna zone). Additionally, the signature-signal generating circuit may be configured to cause impedance changes at the wireless power receiving, which allows for the generation of different signature signals by the signature-signal generating circuit and, thereby, to cause the receipt of the different signature signals at the signature-signal receiving circuit of the first antenna zone. As discussed in more detail below, this allows for creating of a scheme in which authorized wireless power receivers may be detected based on the different signature signals, and un-authorized wireless power receivers may be ignored, to avoid allowing unauthorized devices to leach power from the system.

(A3) In some embodiments of the method of A2, the determining that the authorized wireless power receiver is present on the surface also includes determining, based on the comparison of the one or more signature signals with the one or more predefined signature signals that an object other than a wireless power receiver is present between the authorized wireless power receiver and the surface. The method additional includes: determining that the near-field charging pad is configured to send power transmission signals while an object other than a wireless power receiver is present on the near-field charging pad; and after determining that the near-field charging pad is configured to send power transmission signals while an object other than a wireless power receiver is present on the near-field charging pad, sending the additional power transmission signals.

(A4) In some embodiments of the method of A2, the one or more signature signals are conveyed to the signature-signal receiving circuit of the first power-transfer zone by encoding the one or more signature signals using manipulations to an impedance value of the wireless power receiver, the manipulations to the impedance value causing the amounts of reflected power to vary at different points in time. In some embodiments, the manipulations to the impedance value cause the signature-signal receiving circuit to detect variations in the measurements of reflected power and these variations may be decoded to produce the one or more signature signals (e.g., example decoded signature signals are shown in FIG. 4). In some embodiments, the one or more signature signals comprise a combination of frequency and duty cycle values. In some embodiments, in addition to conveying information regarding whether a wireless power receiver is authorized to receive power from the pad, the one or more signature signals may also be used to convey data to the pad. Examples as to how data may be encoded using the signature signals are shown in FIG. 4.

(A5) In some embodiments of the method of any one of A1-A4, the near-field charging pad includes a data-communication radio, and the sending of the plurality of test power transmission signals is performed without receiving any signal via the data-communication radio.

(A6) In some embodiments of the method of A5, the sending of the plurality of test power transmission signals is performed upon expiration of a predefined time period (e.g., once every second, every two seconds, or every five seconds).

(A7) In some embodiments of the method of any one of A1-A5, the method further includes: in conjunction with the sending of the plurality of test power transmission signals, sending a respective plurality of test power transmission signals by respective power-transferring elements included in each power-transfer zone of the plurality of power-transfer zones; detecting, using respective signature-signal receiving circuits included in each respective power-transfer zone of the plurality of power-transfer zones, respective amounts of reflected power at each of the plurality of power-transfer zones; and determining, for each power-transfer zone of the plurality of power-transfer zones, whether (a) a wireless power receiver and/or (ii) an object other than a wireless power receiver is present at a respective surface adjacent to each of the plurality of power-transfer zones. In other words, each of the power-transfer zones is configured to send the test power transmission signals and to then determine whether any authorized wireless power receiver and/or object is present over that power-transfer zone.

(A8) In some embodiments of the method of A7, the method further includes: based on the respective amounts of reflected power detected at a second power-transfer zone of the plurality of power-transfer zones, determining that an object other than a wireless power receiver is present at the second power-transfer zone; and in accordance with determining that the object other than a wireless power receiver is present at the second power-transfer zone, determining whether the near-field charging pad is configured to transmit wireless power while one or more objects are present on the near-field charging pad. In some embodiments, the sending of the additional power transmission signals is only performed after determining that the near-field charging pad is configured to send wireless power while one or more objects are present on the near-field charging pad. In some embodiments, the near-field charging pad is configured with a parameter that indicates whether it is allowed to send power while foreign objects (e.g., objects other than wireless power receivers) are present on the pad. For instance, an owner or operator of the pad may set this parameter during a setup procedure for the pad. In some embodiments, the classifying may also be performed in a more granular fashion, e.g., to determine types of objects that are not wireless power receivers (e.g., metallic objects, non-metallic objects, credit cards, spilled liquids, etc.).

(A9) In some embodiments of the method of A2 or A3, the one or more processors of the near-field charging pad are in communication with a data source (e.g., an internal or external database) that includes the one or more predefined signature signals.

(A10) In some embodiments of the method of A9, the data source is populated with the one or more predefined signature signals during a configuration process in which each of a plurality of different wireless power receivers is placed on the near-field charging pad to allow the near-field charging pad to detect and then store a respective predefined signature signal for each of the plurality of different wireless power receivers.

(A11) In some embodiments of the method of A10, the configuration process also includes placing a plurality of different objects, which are not wireless power receivers, on the near-field charging pad to allow the near-field charging pad to detect and then store a respective predefined signature signal for each of the plurality of different objects. In some embodiments, during this configuration process, identifiers for each of the different objects are also stored with each of the respective stored signature signals, thereby allowing the near-field charging pad to identify different types of objects based on matching a signature signal to one of the stored signals.

(A12) In some embodiments of the method of any one of A1-A11, the method further includes: after sending the additional power transmission signals, receiving a data-communication signal from the wireless power receiver, the data-communication signal including information that allows the near-field charging pad to determine device-specific values for the first set of transmission characteristics; and in response to receiving the data-communication signal, ceasing to send the additional power transmission signals and instead sending, via the respective power-transfer element included in the first power-transfer zone, further power transmission signals with the device-specific values for the first set of transmission characteristics. In instances in which the wireless power receiver is a device that does not include any data-communication radio, these operations are not performed and instead the pad continues to transmit the additional power transmission signals until a determination is made that the wireless power receiver is fully charged (e.g., the signature-signal generating circuit at the wireless power receiver may be used to generate a signal that conveys to the signature-signal receiving circuit of the first antenna zone that the receiver has reached a fully charged state) or that the wireless power receiver is no longer present on the pad.

(A13) In some embodiments of the method of any one of A1-A12, the first and second values for the first set of transmission characteristics are the same.

(A14) In some embodiments of the method of any one of A1-A13, the first and second values for the first set of transmission characteristics are different.

(A15) In some embodiments of the method of any one of A1-A14, the wireless power receiver comprises a power-receiving element and a rectifier coupled to the power-receiving element for converting alternating current generated by receipt of power transmission signals to direct current (DC), and the signal-generating circuit of the wireless power receiver includes: impedance-modification circuitry positioned at a direct current (DC) output port of the rectifier, the impedance-modification circuitry configured to modify an impedance at the wireless power receiver.

(A16) In some embodiments of the method of any one of A1-A15, the signature-signal receiving circuit comprises the circuitry described above in reference to FIG. 3G.

(A17) In some embodiments of the method of any one of A1-A16, the power-transferring element is a near-field capacitive coupler, and the near-field capacitive coupler comprises a metal layer having a primary coupler and one or more parasitic coupling elements adjacent to the primary coupler on the metal layer.

(A18) In some embodiments of the method of any one of A1-A17, the near-field capacitive coupler is coupled with a power amplifier via a transmission line, the transmission line configured to provide the plurality of test power transmission signals and the additional power transmission signals to the near-field capacitive coupler.

(A19) In some embodiments of the method of any one of A1-A18, the transmission line is coupled with the signature-signal receiving circuit.

(A20) In another aspect, a near-field charging pad is provided. In some embodiments, the near-field charging pad includes a wireless communication component, a plurality of antenna zones that each respectively include at least one antenna element and a signature-signal receiving circuit, one or more processors, and memory storing one or more programs, which when executed by the one or more processors cause the near-field charging pad to perform the method described in any one of A1-A19.

(A21) In yet another aspect, a near-field charging pad is provided and the near-field charging includes means for performing the method described in any one of A1-A19.

(A22) In still another aspect, a non-transitory computer-readable storage medium is provided. The non-transitory computer-readable storage medium stores executable instructions that, when executed by a near-field charging pad (that includes a wireless communication component, a plurality of antenna zones that each respectively include at least one antenna element and a signature-signal receiving circuit) with one or more processors/cores, cause the near-field charging pad to perform the method described in any one of A1-A19.

Thus, wireless charging systems configured in accordance with the principles described herein are able to one or more operations including (1) identifying an authorized electronic device, (2) discovering any foreign object between the RF charging pad and the wireless power receivers, and/or (3) managing power transfer control communication between the RF charging pad and wireless power receivers with or without any data-communication capability, thereby providing numerous improvements and resolving numerous problems and limitations of conventional charging pads.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not intended to circumscribe or limit the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1A:
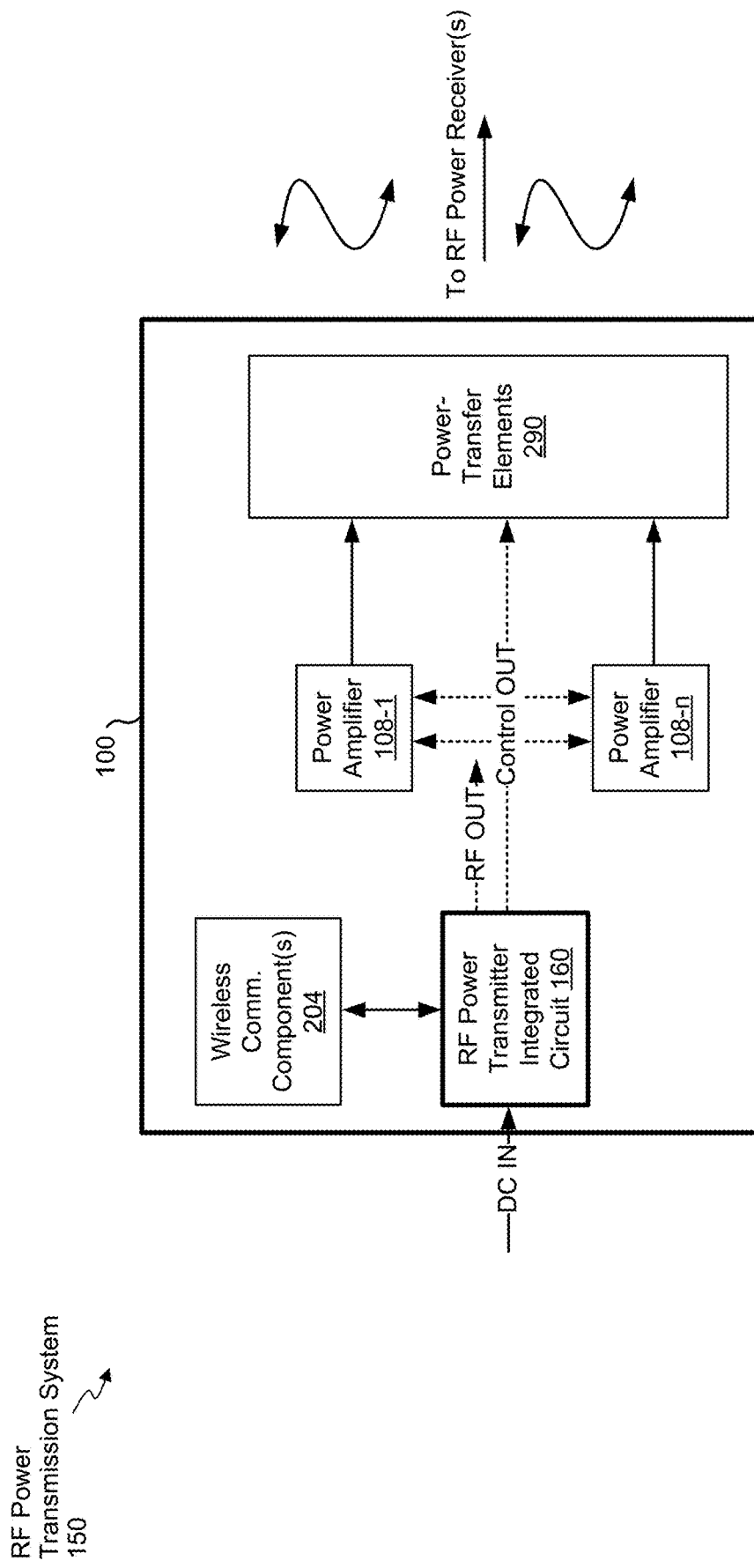
FIG. 1A is a block diagram of an RF wireless power transmission system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1A is a block diagram of an RF wireless power transmission system 150 in accordance with some embodiments. In some embodiments, the RF wireless power transmission system 150 includes a RF charging pad 100 (also referred to herein as a near-field (NF) charging pad 100 or RF charging pad 100). In some embodiments, the RF charging pad 100 includes an RF power transmitter integrated circuit 160 (described in more detail below). In some embodiments, the RF charging pad 100 includes one or more communications components 204 (e.g., wireless communication components, such as WI-FI or BLUETOOTH radios), discussed in more detail below with reference to FIG. 2A. In some embodiments, the RF charging pad 100 also connects to one or more power amplifier units 108-1, . . . 108-n to control operation of the one or more power amplifier units when they drive external power-transfer elements (e.g., power-transfer elements 290). In some embodiments, RF power is controlled and modulated at the RF charging pad 100 via switch circuitry as to enable the RF wireless power transmission system to send RF power to one or more wireless receiving devices via the TX antenna array 210.

In some embodiments, the communication component(s) 204 enable communication between the RF charging pad 100 and one or more communication networks. In some embodiments, the communication component(s) 204 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

In some instances, the communication component(s) 204 are not able to communicate with wireless power receivers for various reasons, e.g., because there is no power available for the communication component(s) to use for the transmission of data signals or because the wireless power receiver itself does not actually include any communication component of its own. As such, it is important to design near-field charging pads that are still able to uniquely identify different types of devices and, when a wireless power receiver is detected, figure out if that wireless power receiver is authorized to receive wireless power.

Figure 1B:
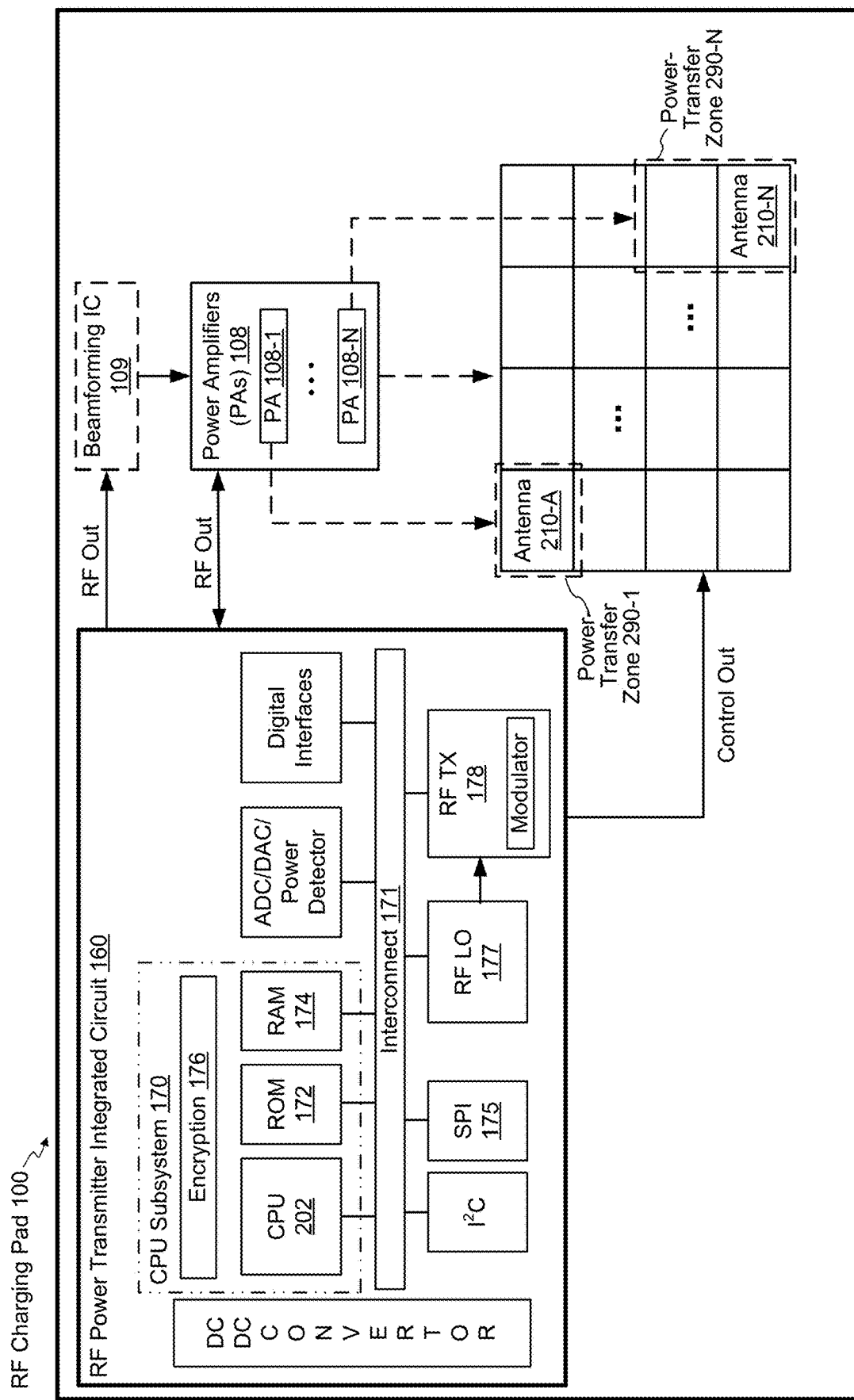
FIG. 1B is a block diagram showing components of an example RF charging pad that includes an RF power transmitter integrated circuit and antenna zones, in accordance with some embodiments.

FIG. 1B is a block diagram of the RF power transmitter integrated circuit 160 (the "integrated circuit") in accordance with some embodiments. In some embodiments, the integrated circuit 160 includes a CPU subsystem 170, an external device control interface, an RF subsection for DC to RF power conversion, and analog and digital control interfaces interconnected via an interconnection component, such as a bus or interconnection fabric block 171. In some embodiments, the CPU subsystem 170 includes a microprocessor unit (CPU) 202 with related Read-Only-Memory (ROM) 172 for device program booting via a digital control interface, e.g. an I$^2$C port, to an external FLASH containing the CPU executable code to be loaded into the CPU Subsystem Random Access Memory (RAM) 174 (e.g., memory 206, FIG. 2A) or executed directly from FLASH. In some embodiments, the CPU subsystem 170 also includes an encryption module or block 176 to authenticate and secure communication exchanges with external devices, such as wireless power receivers that attempt to receive wirelessly delivered power from the RF charging pad 100.

In some embodiments, executable instructions running on the CPU (such as those shown in the memory 206 in FIG. 2A and described below) are used to manage operation of the RF charging pad 100 and to control external devices through a control interface, e.g., SPI control interface 175, and the other analog and digital interfaces included in the RF power transmitter integrated circuit 160. In some embodiments, the CPU subsystem also manages operation of the RF subsection of the RF power transmitter integrated circuit 160, which includes an RF local oscillator (LO) 177 and an RF transmitter (TX) 178. In some embodiments, the RF LO 177 is adjusted based on instructions from the CPU subsystem 170 and is thereby set to different desired frequencies of operation, while the RF TX converts, amplifies, modulates the RF output as desired to generate a viable RF power level.

In the descriptions that follow, various references are made to antenna zones and power-transfer zones, which terms are used synonymously in this disclosure. In some embodiments the antenna/power-transfer zones may include antenna elements that transmit propagating radio frequency waves but, in other embodiments, the antenna/power transfer zones may instead include capacitive charging couplers that convey electrical signals but do not send propagating radio frequency waves.

In some embodiments, the RF power transmitter integrated circuit 160 provides the viable RF power level (e.g., via the RF TX 178) to an optional beamforming integrated circuit (IC) 109, which then provides phase-shifted signals to one or more power amplifiers 108. In some embodiments, the beamforming IC 109 is used to ensure that power transmission signals sent using two or more antennas 210 (e.g., each antenna 210 may be associated with a different antenna zone 290 or may each belong to a single antenna zone 290) to a particular wireless power receiver are transmitted with appropriate characteristics (e.g., phases) to ensure that power transmitted to the particular wireless power receiver is maximized (e.g., the power transmission signals arrive in phase at the particular wireless power receiver). In some embodiments, the beamforming IC 109 forms part of the RF power transmitter IC 160. In embodiments in which capacitive couplers (e.g., capacitive charging couplers 244) are used as the antennas 210, then optional beamforming IC 109 may not be included in the RF power transmitter integrated circuit 160.

In some embodiments, the RF power transmitter integrated circuit 160 provides the viable RF power level (e.g., via the RF TX 178) directly to the one or more power amplifiers 108 and does not use the beamforming IC 109 (or bypasses the beamforming IC if phase-shifting is not required, such as when only a single antenna 210 is used to transmit power transmission signals to a wireless power receiver).

In some embodiments, the one or more power amplifiers 108 then provide RF signals to the antenna zones 290 (also referred to herein as "power-transfer zones") for transmission to wireless power receivers that are authorized to receive wirelessly delivered power from the RF charging pad 100. In some embodiments, each antenna zone 290 is coupled with a respective PA 108 (e.g., antenna zone 290-1 is coupled with PA 108-1 and antenna zone 290-N is coupled with PA 108-N). In some embodiments, multiple antenna zones are each coupled with a same set of PAs 108 (e.g., all PAs 108 are coupled with each antenna zone 290). Various arrangements and couplings of PAs 108 to antenna zones 290 allow the RF charging pad 100 to sequentially or selectively activate different antenna zones in order to determine the most efficient antenna zone 290 to use for transmitting wireless power to a wireless power receiver (as explained in more detail below in reference to FIGS. 9A-9B, 10, and 11A-11E). In some embodiments, the one or more power amplifiers 108 are also in communication with the CPU subsystem 170 to allow the CPU 202 to measure output power provided by the PAs 108 to the antenna zones of the RF charging pad 100.

FIG. 1B also shows that, in some embodiments, the antenna zones 290 of the RF charging pad 100 may include one or more antennas 210A-N. In some embodiments, each antenna zones of the plurality of antenna zones includes one or more antennas 210 (e.g., antenna zone 290-1 includes one antenna 210-A and antenna zones 290-N includes multiple antennas 210). In some embodiments, a number of antennas included in each of the antenna zones is dynamically defined based on various parameters, such as a location of a wireless power receiver on the RF charging pad 100. In some embodiments, the antenna zones may include one or more of the meandering line antennas described in more detail below. In some embodiments, each antenna zone 290 may include antennas of different types (e.g., a meandering line antenna and a loop antenna), while in other embodiments each antenna zone 290 may include a single antenna of a same type (e.g., all antenna zones 290 include one meandering line antenna), while in still other embodiments, the antennas zones may include some antenna zones that include a single antenna of a same type and some antenna zones that include antennas of different types. In some embodiments the antenna/power-transfer zones may also or alternatively include capacitive charging couplers that convey electrical signals but do not send propagating radio frequency waves. Antenna zones are also described in further detail below.

In some embodiments, the RF charging pad 100 may also include a temperature monitoring circuit that is in communication with the CPU subsystem 170 to ensure that the RF charging pad 100 remains within an acceptable temperature range. For example, if a determination is made that the RF charging pad 100 has reached a threshold temperature, then operation of the RF charging pad 100 may be temporarily suspended until the RF charging pad 100 falls below the threshold temperature.

By including the components shown for RF power transmitter circuit 160 (FIG. 1B) on a single chip, such transmitter chips are able to manage operations at the transmitter chips more efficiently and quickly (and with lower latency), thereby helping to improve user satisfaction with the charging pads that are managed by these transmitter chips. For example, the RF power transmitter circuit 160 is cheaper to construct, has a smaller physical footprint, and is simpler to install. Furthermore, and as explained in more detail below in reference to FIG. 2A, the RF power transmitter circuit 160 may also include a secure element module 234 (e.g., included in the encryption block 176 shown in FIG. 1B) that is used in conjunction with a secure element module 282 (FIG. 2B) or a receiver 104 to ensure that only authorized receivers are able to receive wirelessly delivered power from the RF charging pad 100 (FIG. 1B).

Figure 1C:
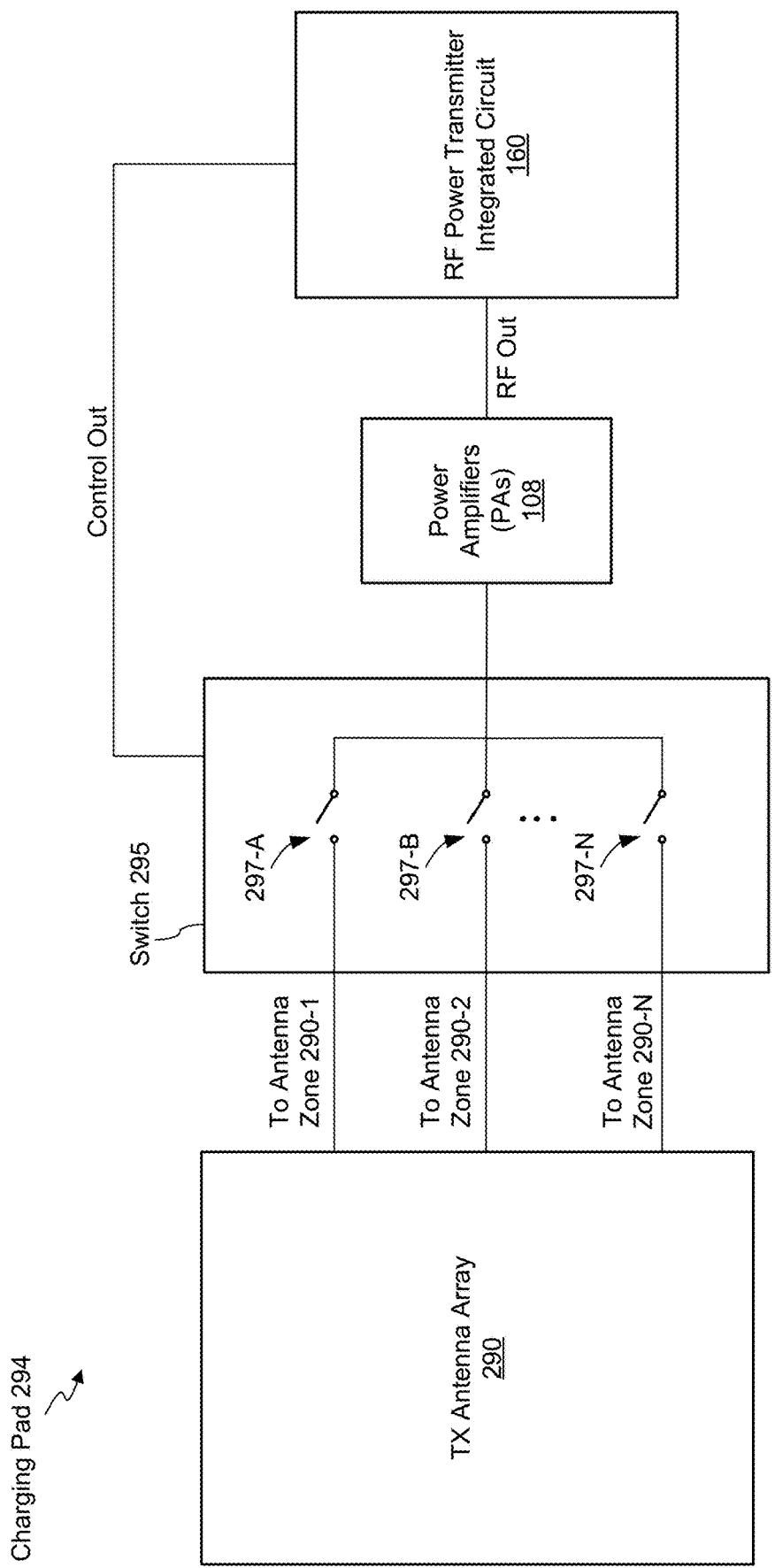
FIG. 1C is a block diagram showing components of an example RF charging pad that includes an RF power transmitter integrated circuit coupled to a switch, in accordance with some embodiments.

FIG. 1C is a block diagram of a charging pad 294 in accordance with some embodiments. The charging pad 294 is an example of the charging pad 100 (FIG. 1A), however, one or more components included in the charging pad 100 are not included in the charging pad 294 for ease of discussion and illustration.

The charging pad 294 includes an RF power transmitter integrated circuit 160, one or more power amplifiers 108, and a transmitter antenna array 290 having multiple antenna zones. Each of these components is described in detail above with reference to FIGS. 1A and 1B. Additionally, the charging pad 294 includes a switch 295 (i.e., transmitter-side switch), positioned between the power amplifiers 108 and the antenna array 290, having a plurality of switches 297-A, 297-B, . . . 297-N. The switch 295 is configured to switchably connect one or more power amplifiers 108 with one or more antenna zones of the antenna array 290 in response to control signals provided by the RF power transmitter integrated circuit 160.

To accomplish the above, each switch 297 is coupled with (e.g., provides a signal pathway to) a different antenna zone of the antenna array 290. For example, switch 297-A may be coupled with a first antenna zone 290-1 (FIG. 1B) of the antenna array 290, switch 297-B may be coupled with a second antenna zone 290-2 of the antenna array 290, and so on. Each of the plurality of switches 297-A, 297-B, . . . 297-N, once closed, creates a unique pathway between a respective power amplifier 108 (or multiple power amplifiers 108) and a respective antenna zone of the antenna array 290. Each unique pathway through the switch 295 is used to selectively provide RF signals to specific antenna zones of the antenna array 290. It is noted that two or more of the plurality of switches 297-A, 297-B, . . . 297-N may be closed at the same time, thereby creating multiple unique pathways to the antenna array 290 that may be used simultaneously.

In some embodiments, the RF power transmitter integrated circuit 160 is coupled to the switch 295 and is configured to control operation of the plurality of switches 297-A, 297-B, . . . 297-N (illustrated as a "control out" signal in FIGS. 1A and 1C). For example, the RF power transmitter integrated circuit 160 may close a first switch 297-A while keeping the other switches open. In another example, the RF power transmitter integrated circuit 160 may close a first switch 297-A and a second switch 297-B, and keep the other switches open (various other combinations and configuration are possible). Moreover, the RF power transmitter integrated circuit 160 is coupled to the one or more power amplifiers 108 and is configured to generate a suitable RF signal (e.g., the "RF Out" signal) and provide the RF signal to the one or more power amplifiers 108. The one or more power amplifiers 108, in turn, are configured to provide the RF signal to one or more antenna zones of the antenna array 290 via the switch 295, depending on which switches 297 in the switch 295 are closed by the RF power transmitter integrated circuit 160.

To further illustrate, as described in some embodiments below, the charging pad is configured to transmit test power transmission signals and/or regular power transmission signals using different antenna zones, e.g., depending on a location of a receiver on the charging pad. Accordingly, when a particular antenna zone is selected for transmitting test signals or regular power signals, a control signal is sent to the switch 295 from the RF power transmitter integrated circuit 160 to cause at least one switch 297 to close. In doing so, an RF signal from at least one power amplifier 108 can be provided to the particular antenna zone using a unique pathway created by the now-closed at least one switch 297.

In some embodiments, the switch 295 may be part of (e.g., internal to) the antenna array 290. Alternatively, in some embodiments, the switch 295 is separate from the antenna array 290 (e.g., the switch 295 may be a distinct component, or may be part of another component, such as the power amplifier(s) 108). It is noted that any switch design capable of accomplishing the above may be used, and the design of the switch 295 illustrated in FIG. 1C is merely one example.

Figure 2A:
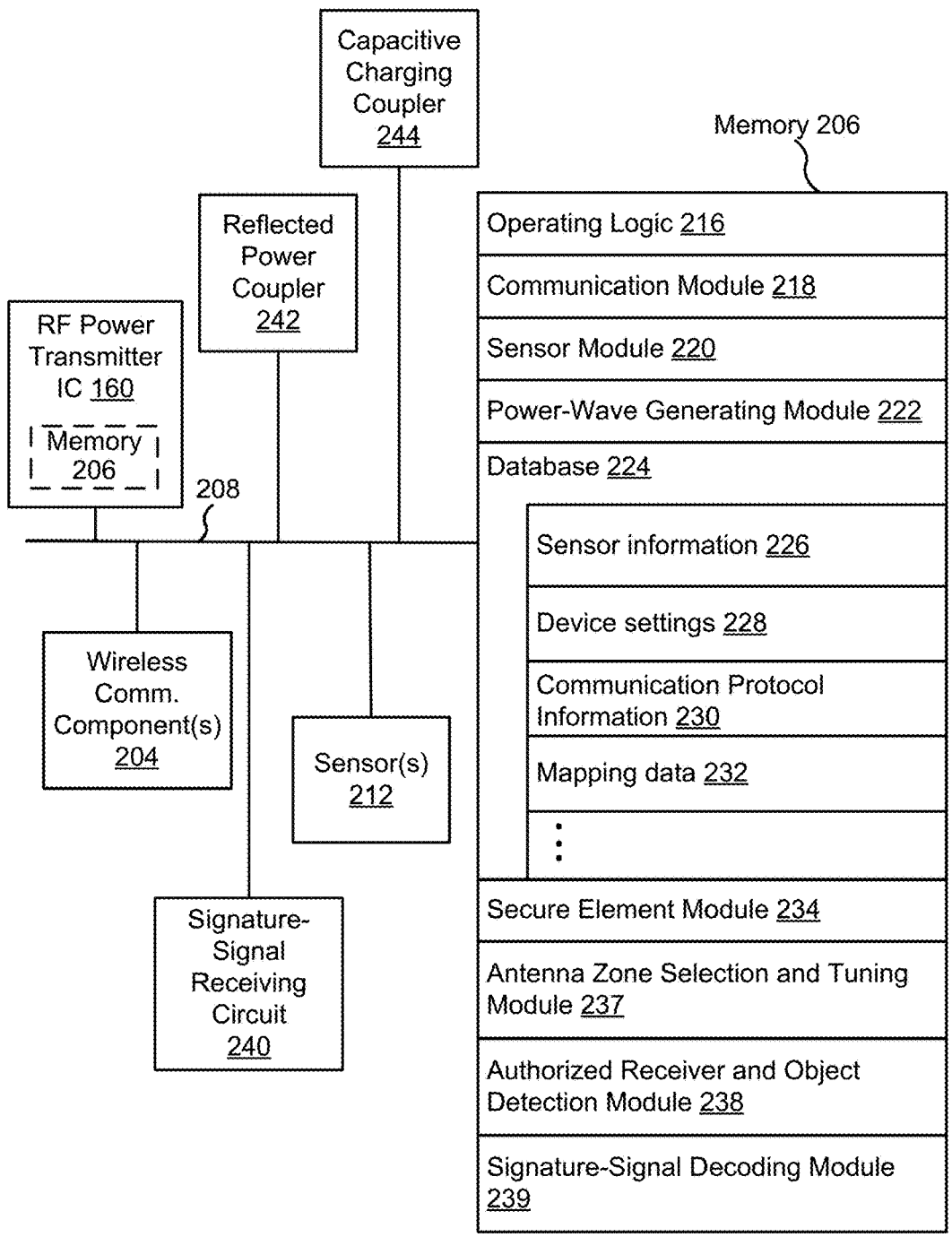
FIG. 2A is a block diagram illustrating an example RF charging pad, in accordance with some embodiments.

FIG. 2A is a block diagram illustrating certain components of an RF charging pad 100 in accordance with some embodiments. In some embodiments, the RF charging pad 100 includes an RF power transmitter IC 160 (and the components included therein, such as those described above in reference to FIGS. 1A-1B), memory 206 (which may be included as part of the RF power transmitter IC 160, such as nonvolatile memory 206 that is part of the CPU subsystem 170), and one or more communication buses 208 for interconnecting these components (sometimes called a chipset). In some embodiments, the RF charging pad 100 includes one or more sensor(s) 212 (discussed below). In some embodiments, the RF charging pad 100 includes one or more output devices such as one or more indicator lights, a sound card, a speaker, a small display for displaying textual information and error codes, etc. In some embodiments, the RF charging pad 100 includes a location detection device, such as a GPS (global positioning satellite) or other geo-location receiver, for determining the location of the RF charging pad 100.

In some embodiments, the one or more sensor(s) 212 include one or more thermal radiation sensors, ambient temperature sensors, humidity sensors, IR sensors, occupancy sensors (e.g., RFID sensors), ambient light sensors, motion detectors, accelerometers, and/or gyroscopes.

Figure 5A:
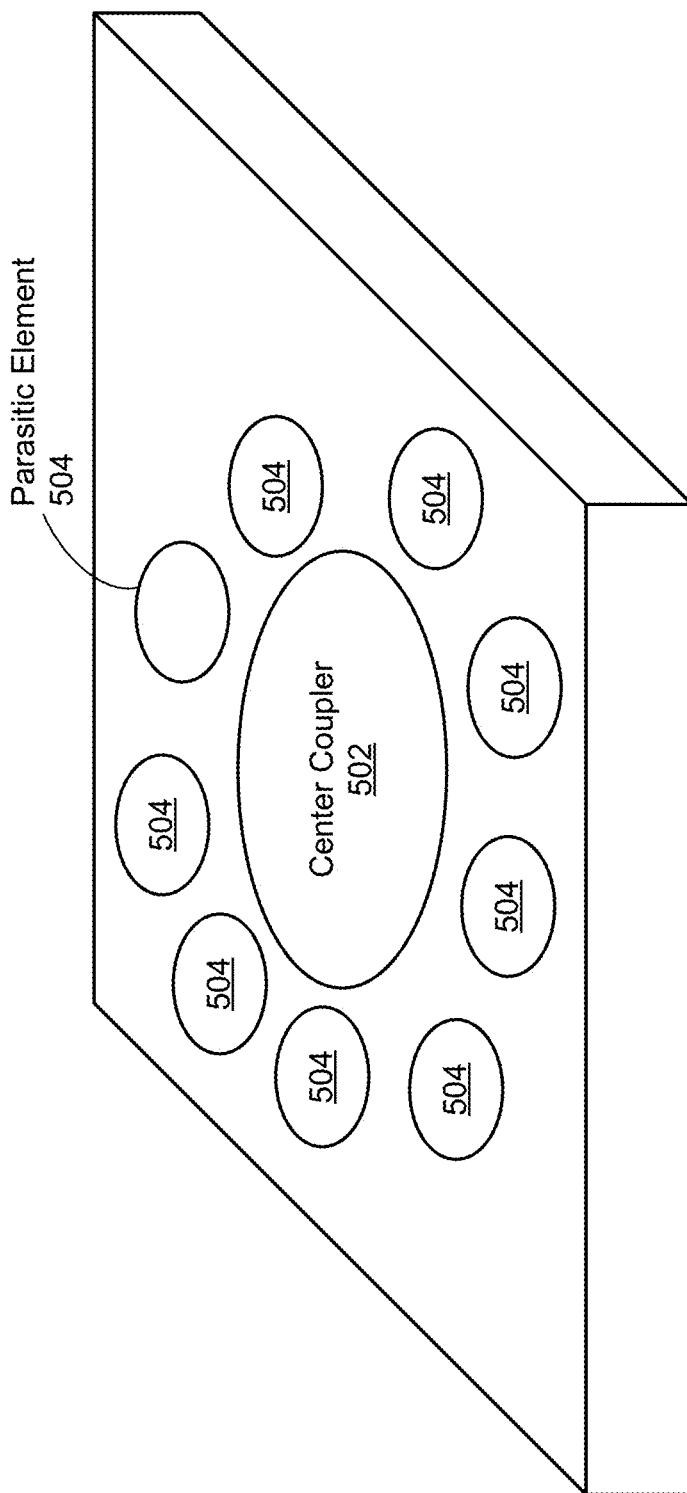
FIG. 5A illustrates a simplified diagram showing a highly-coupled near-field capacitive coupler that is used in a wireless power transmitter in accordance with some embodiments.

In some embodiments, the RF charging pad 100 further includes a signature-signal receiving circuit 240 (FIGS. 3A and 3E-3G), a reflected power coupler 242 (e.g., FIGS. 3A and 3E), and a capacitive charging coupler 244 (FIG. 5A).

The memory 206 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, or alternatively the non-volatile memory within memory 206, includes a non-transitory computer-readable storage medium. In some embodiments, the memory 206, or the non-transitory computer-readable storage medium of the memory 206, stores the following programs, modules, and data structures, or a subset or superset thereof:

- Operating logic 216 including procedures for handling various basic system services and for performing hardware dependent tasks;
- Communication module 218 for coupling to and/or communicating with remote devices (e.g., remote sensors, transmitters, receivers, servers, mapping memories, etc.) in conjunction with wireless communication component(s) 204;
- Sensor module 220 for obtaining and processing sensor data (e.g., in conjunction with sensor(s) 212) to, for example, determine the presence, velocity, and/or positioning of object in the vicinity of the RF charging pad 100;
- Power-wave generating module 222 for generating and transmitting power transmission signals (e.g., in conjunction with antenna zones 290 and the antennas 210 respectively included therein), including but not limited to, forming pocket(s) of energy at given locations. Power-wave generating module 222 may also be used to modify values of transmission characteristics (e.g., power level (i.e., amplitude), phase, frequency, etc.) used to transmit power transmission signals by individual antenna zones;
- Database 224, including but not limited to:
  - Sensor information 226 for storing and managing data received, detected, and/or transmitted by one or more sensors (e.g., sensors 212 and/or one or more remote sensors);
  - Device settings 228 for storing operational settings for the RF charging pad 100 and/or one or more remote devices;
  - Communication protocol information 230 for storing and managing protocol information for one or more protocols (e.g., custom or standard wireless protocols, such as ZigBee, Z-Wave, etc., and/or custom or standard wired protocols, such as Ethernet); and
  - Mapping data 232 for storing and managing mapping data (e.g., mapping one or more transmission fields);
  - Learned signature signals (not shown) for a variety of different wireless power receivers and other objects (which are not wireless power receivers, which are described in more detail below in reference to FIG. 9A;
- a secure element module 234 for determining whether a wireless power receiver is authorized to receive wirelessly delivered power from the RF charging pad 100;
- an antenna zone selecting and tuning module 237 for coordinating a process of transmitting test power transmission signals with various antenna zones to determine which antenna zone or zones should be used to wirelessly deliver power to various wireless power receivers (as is explained in more detail below in reference to FIGS. 9A-9B of incorporated-by-reference PCT Patent Application No. PCT/US17/65886);
- an authorized receiver and object detection module 238 used for detecting various signature signals from wireless power receivers and from other objects, and then determining appropriate actions based on the detecting of the various signature signals (as is described in more detail below in reference to FIGS. 9A-9B); and
- a signature-signal decoding module used to decode the detected signature signals and determine message or data content.

Each of the above-identified elements (e.g., modules stored in memory 206 of the RF charging pad 100) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 206, optionally, stores a subset of the modules and data structures identified above.

Figure 2B:
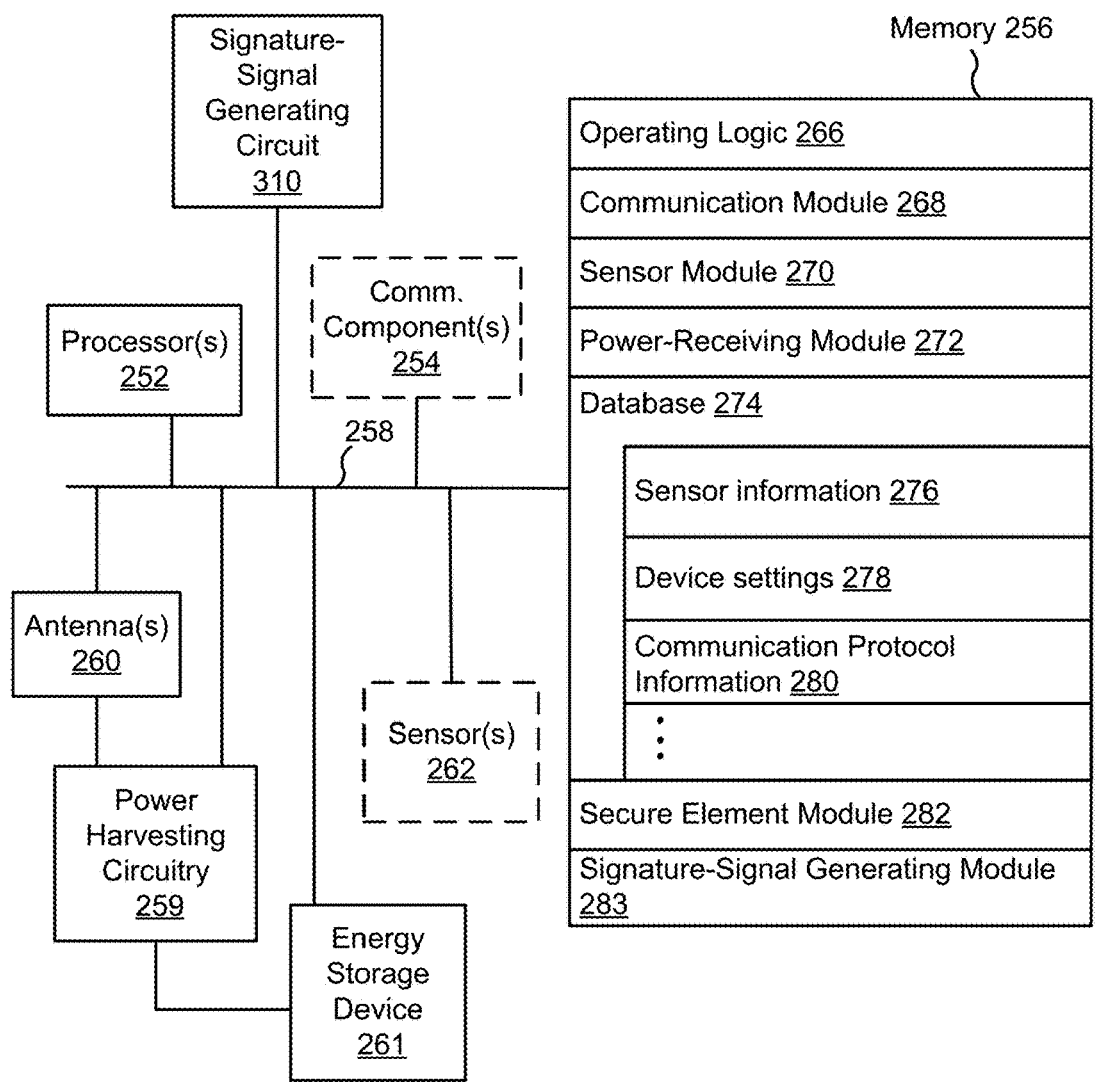
FIG. 2B is a block diagram illustrating an example receiver device, in accordance with some embodiments.

FIG. 2B is a block diagram illustrating a representative receiver device 104 (also sometimes called a receiver, power receiver, or wireless power receiver) in accordance with some embodiments. In some embodiments, the receiver device 104 includes one or more processing units (e.g., CPUs, ASICs, FPGAs, microprocessors, and the like) 252, one or more communication components 254, memory 256, antenna(s) 260, power harvesting circuitry 259, and one or more communication buses 258 for interconnecting these components (sometimes called a chipset). In some embodiments, the receiver device 104 includes one or more sensor(s) 262 such as the one or sensors 212 described above with reference to FIG. 2A. In some embodiments, the receiver device 104 includes an energy storage device 261 for storing energy harvested via the power harvesting circuitry 259. In various embodiments, the energy storage device 261 includes one or more batteries, one or more capacitors, one or more inductors, and the like.

In some embodiments, the power harvesting circuitry 259 includes one or more rectifying circuits and/or one or more power converters. In some embodiments, the power harvesting circuitry 259 includes one or more components (e.g., a power converter) configured to convert energy from power waves and/or energy pockets to electrical energy (e.g., electricity). In some embodiments, the power harvesting circuitry 259 is further configured to supply power to a coupled electronic device, such as a laptop or phone. In some embodiments, supplying power to a coupled electronic device include translating electrical energy from an AC form to a DC form (e.g., usable by the electronic device).

In some embodiments, the signature-signal generating circuit 315 includes one or more components as discussed with reference to FIGS. 3A-3D.

In some embodiments, the antenna(s) 260 include one or more of the meandering line antennas that are described in further detail below. In some embodiments, the antenna(s) 260 may also or alternatively include capacitive charging couplers that correspond in structure to those that may be present in a near-field charging pad.

In some embodiments, the receiver device 104 includes one or more output devices such as one or more indicator lights, a sound card, a speaker, a small display for displaying textual information and error codes, etc. In some embodiments, the receiver device 104 includes a location detection device, such as a GPS (global positioning satellite) or other geo-location receiver, for determining the location of the receiver device 103.

In various embodiments, the one or more sensor(s) 262 include one or more thermal radiation sensors, ambient temperature sensors, humidity sensors, IR sensors, occupancy sensors (e.g., RFID sensors), ambient light sensors, motion detectors, accelerometers, and/or gyroscopes.

The communication component(s) 254 enable communication between the receiver 104 and one or more communication networks. In some embodiments, the communication component(s) 254 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

The communication component(s) 254 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 256 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 256, or alternatively the non-volatile memory within memory 256, includes a non-transitory computer-readable storage medium. In some embodiments, the memory 256, or the non-transitory computer-readable storage medium of the memory 256, stores the following programs, modules, and data structures, or a subset or superset thereof:

Operating logic 266 including procedures for handling various basic system services and for performing hardware dependent tasks;

Communication module 268 for coupling to and/or communicating with remote devices (e.g., remote sensors, transmitters, receivers, servers, mapping memories, etc.) in conjunction with communication component(s) 254;

Sensor module 270 for obtaining and processing sensor data (e.g., in conjunction with sensor(s) 262) to, for example, determine the presence, velocity, and/or positioning of the receiver 103, a RF charging pad 100, or an object in the vicinity of the receiver 103;

Wireless power-receiving module 272 for receiving (e.g., in conjunction with antenna(s) 260 and/or power harvesting circuitry 259) energy from, capacitively-conveyed electrical signals, power waves, and/or energy pockets; optionally converting (e.g., in conjunction with power harvesting circuitry 259) the energy (e.g., to direct current); transferring the energy to a coupled electronic device; and optionally storing the energy (e.g., in conjunction with energy storage device 261);

Database 274, including but not limited to:
  Sensor information 276 for storing and managing data received, detected, and/or transmitted by one or more sensors (e.g., sensors 262 and/or one or more remote sensors);
  Device settings 278 for storing operational settings for the receiver 103, a coupled electronic device, and/or one or more remote devices; and
  Communication protocol information 280 for storing and managing protocol information for one or more protocols (e.g., custom or standard wireless protocols, such as ZigBee, Z-Wave, etc., and/or custom or standard wired protocols, such as Ethernet); and
  a secure element module 282 for providing identification information to the RF charging pad 100 (e.g., the RF charging pad 100 uses the identification information to determine if the wireless power receiver 104 is authorized to receive wirelessly delivered power); and
  a signature-signal generating module 283 used to control (in conjunction with the signature-signal generating circuit 315) various components to cause impedance changes at the antenna(s) 260 and/or power harvesting circuitry 259 to then cause changes in reflected power as received by a signature-signal receiving circuit 240.

Each of the above-identified elements (e.g., modules stored in memory 256 of the receiver 104) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 256, optionally, stores a subset of the modules and data structures identified above. Furthermore, the memory 256, optionally, stores additional modules and data structures not described above, such as an identifying module for identifying a device type of a connected device (e.g., a device type for an electronic device that is coupled with the receiver 104).

In some embodiments, the near-field charging pads disclosed herein may use adaptive loading techniques to optimize power transfer. Such techniques are described in detail in commonly-owned PCT Application No. PCT/US17/65886 and, in particular, in reference to FIGS. 3A-8 and 12-15, and the disclosures in this commonly-owned application is hereby expressly incorporated by reference in its entirety.

Figure 3A:
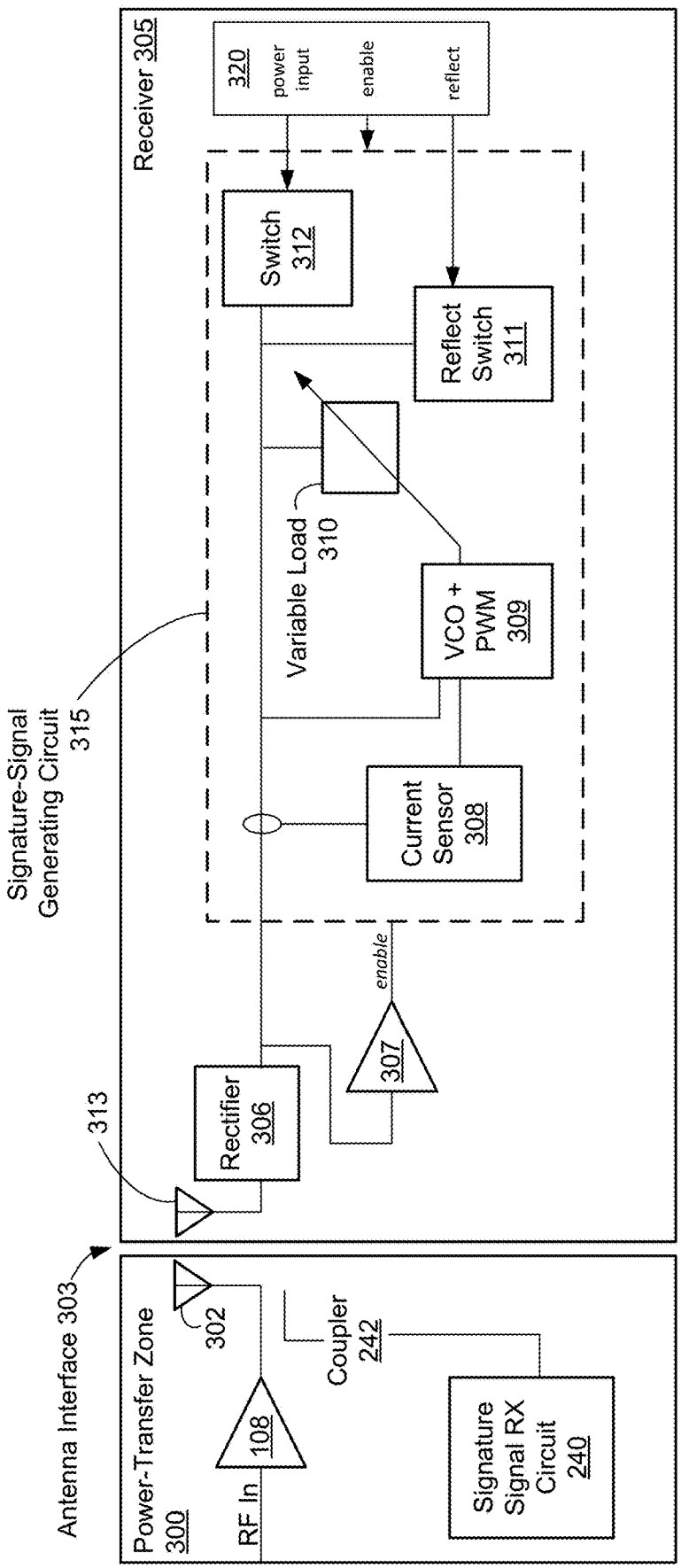
FIG. 3A is a block diagram of simplified circuits of an example wireless transmitter located at a RF charging pad and an example wireless receiver located at a receiver device in accordance with some embodiments.

FIG. 3A is a block diagram of simplified circuits of an example wireless power-transfer zone 300 (e.g., one of the plurality of power-transfer zones 290A-N, FIG. 1B) located at the RF charging pad 100, and an example wireless power receiver 305 (e.g., an instance of the receiver 104, FIG. 2B), in accordance with some embodiments. In some embodiments, the wireless power receiver 305 includes a signature-signal generating circuit 315, as discussed with reference to FIGS. 3B-3D. It is noted that the power-transfer zone 300 may be referred to below, or illustrated in the Figures, as a transmitter (TX).

In some embodiments, an oscillator on the receiver device 305 includes one or more elements configured to control duty cycle and frequency and modulate a variable load 310 at the rectifier DC output port. In some embodiments, the rectifier voltage is encoded as frequency, and the rectifier load current is encoded as duty cycle (or vice versa). In some embodiments, the host 320 (e.g., CPU) controls the oscillator frequency and duty cycle, where each frequency/duty pair corresponds to a different message to be delivered to the power-transfer zone 300 located at the RF charging pad 100. In some embodiments, the receiver 305 includes a power-link monitoring chip with interfaces to the host 320 and the rectifier 306, and the power-link monitoring chip can also control the frequency/duty cycle of the oscillator. In some embodiments, the frequency and duty cycle variations are analyzed to recognize whether there are any foreign objects on the RF charging pad 100 (e.g., between the RF charging pad 100 and the receiver device 305 on top of the RF charging pad 100).

In some embodiments, the DC load modulation varies the impedance at the antenna interface 303 between the power-transfer zone 300 and the receiver 305. In some embodiments, the impedance change causes variations in reflected power (e.g., reflected power 340, FIG. 3B-1) at the receiver block 240 residing on the power-transfer zone 300, and such receiver block 240 decodes the variations to identify the reflected signals including information related to frequency and duty cycle (e.g., frequency and duty cycle are shown in FIG. 3E). In some embodiments, the rectifier loading conditions are known at the power-transfer zone 300. In some embodiments, it is determined whether the receiver host message is known at the transmit side to identify authorized receivers. In some embodiments, oscillator/modulator are enabled/disabled based on (1) configurable (voltage) threshold on rectifier DC output and/or (2) firmware control.

Figures 2, 3B:
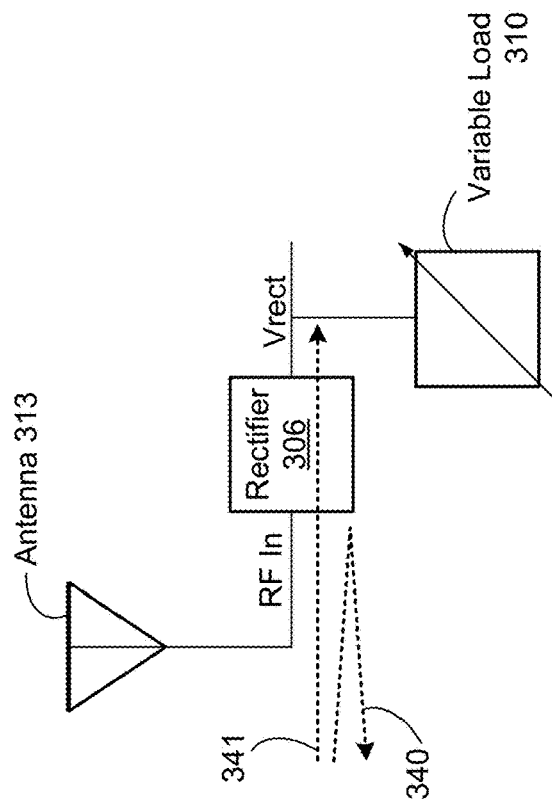
FIGS. 3B-1 and 3B-2 show block diagrams illustrating circuits including a rectifier coupled to a variable load of a wireless receiver located at a receiver device in accordance with some embodiments.
Figures 1, 3B:
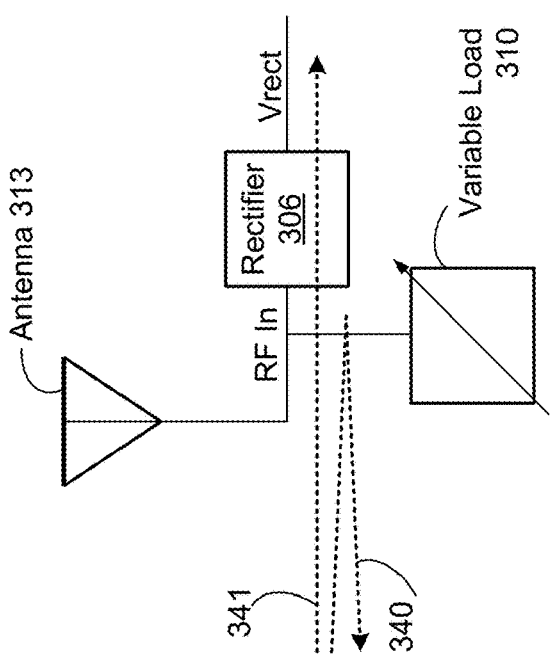

FIGS. 3B-1 and 3B-2 show block diagrams illustrating circuits including a rectifier 306 coupled to a variable load 310 of a receiver device (e.g., receiver device 305, FIG. 3A), in accordance with some embodiments. In some embodiments, the rectifier 306 converts RF power received at the RFin port into DC power at the Vrect port. In some embodiments, the amount of power received is dependent on the amount of power input by the antenna 313 (e.g., antenna(s) 260, FIG. 2B) of the receiver 305 and the impedance match between the antenna 313 of the receiver 305 and the rectifier 306. In some embodiments when the impedances of the antenna 313 and the rectifier 306 are matched, substantially all of the power from the antenna 313 enters the rectifier 306 and substantially none of the power is reflected (illustrated by lines 341 in FIGS. 3B-1 and 3B-2). When the impedances of the antenna 313 and the rectifier 306 are not matched, then some power from the antenna 313 is reflected off the rectifier 306 and the reflected power signals 310 are transmitted back to the antenna 313 (illustrated by lines 340 in FIGS. 3B-1 and 3B-2).

In some embodiments, the reflected power 340 is a source of system inefficiency in that it reduces the total amount of DC power that could be obtained from an available amount of RF power. In some embodiments, reflecting all, or a substantial portion, of the RF input power can be useful if no power is intended to be received at the receiver device 305. For example, if the host 320 battery is full, then the received power must be dissipated as heat somewhere in the receiver 305. Therefore, in some embodiments, it can be more thermally effective to reflect that power back out of the antenna 313.

In some embodiments, the reflected power signals 340 can be modulated for the purposes of data communications, as referred to as "load modulation" and this can be accomplished in some embodiments by placing a variable load 310 at the rectifier RFin port (FIG. 3B-1). In some embodiments in a load-modulated system, the amount of power reflected is controlled by a variable load 310 located at the RF input (FIG. 3B-1). This type of control has disadvantages: even when OFF, the variable load 310 introduces a loss at the RF frequency and therefore reduces the RF to DC conversion efficiency. In some embodiments, very high Q bandpass filters are needed to filter the modulation spectrum for regulatory compliance.

Controlling the amount of reflected power 340 may also be used for conveying data to a signature-signal receiving circuit 240 (e.g., included in a respective power-transfer zone of an RF charging pad). In some embodiments, the signature-signal receiving circuit 240 is a universal circuit for the NF charging pad 100 (i.e., the NF charging pad 100 includes a single signature-signal receiving circuit 240 that services each of the power-transfer zones 290). Alternatively, in some embodiments, each of the power-transfer zones (e.g., zone 300) includes its own signature-signal receiving circuit 240 (as shown in FIG. 3A).

In accordance with the embodiments disclosed herein, the inventors have determined that it is advantageous to locate the variable load 310 at the Vrect port (DC side) of the rectifier 306 (FIG. 3B-2), as is discussed in more detail below. In some embodiments, the variable load 310 can be moved to the DC side of the rectifier 306 (FIG. 3B-2). The rectifier 306 thus operates both as a downconverter (converting RF power to DC power) and an upconverter (converting the load modulation at Vrect to the RF frequency at RFin). In some embodiments, having the variable load 310 located at the DC side of the rectifier 306 solves disadvantages mentioned above that are present when the variable load 310 is placed at the RFin port.

Figure 3C:
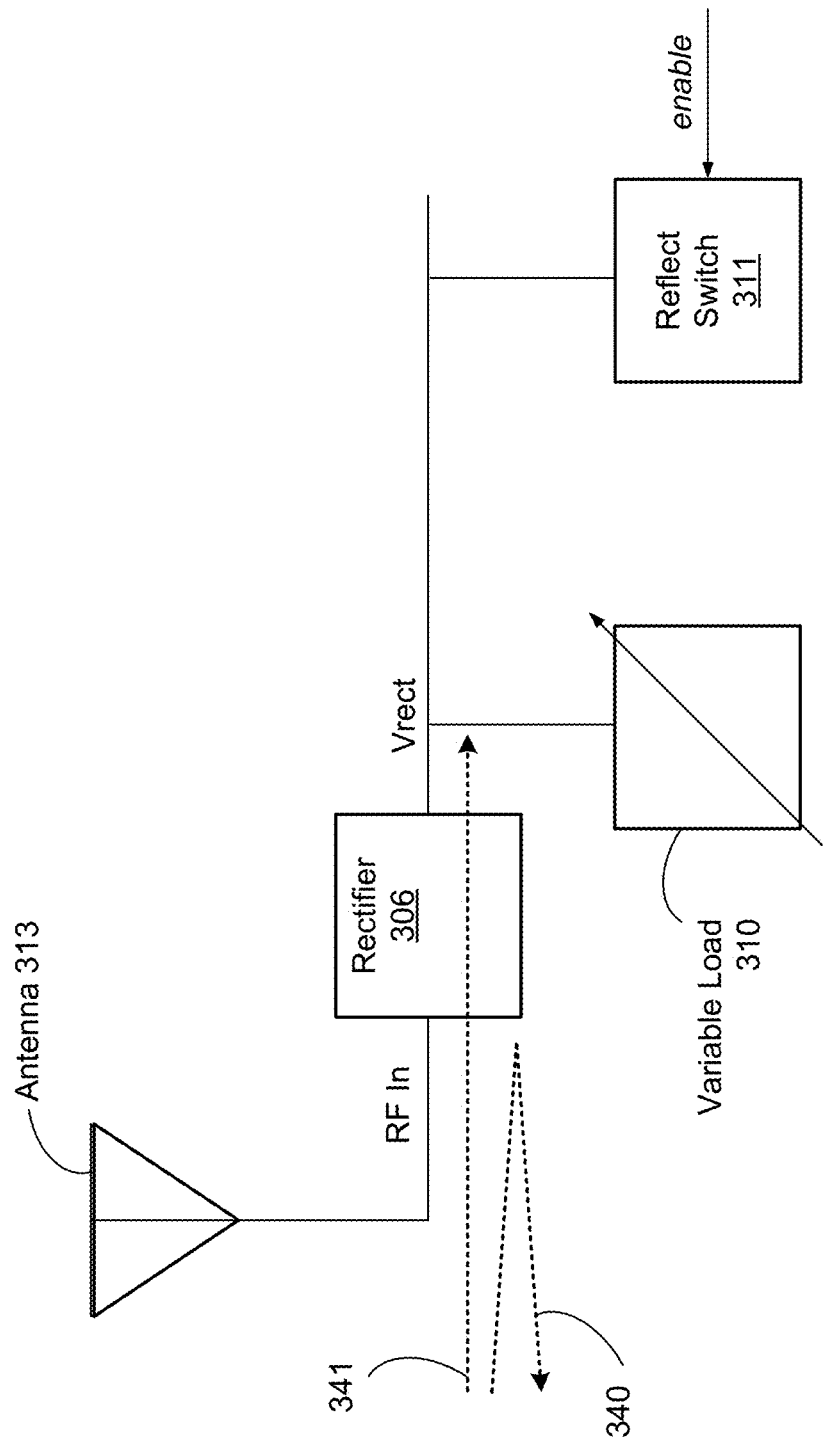
FIG. 3C is a block diagram illustrating circuits including a reflect switch within a wireless receiver located at a receiver device in accordance with some embodiments.

FIG. 3C is a block diagram illustrating circuits including a reflect switch 311 within a wireless power receiver 305 (pictured in FIG. 3A) in accordance with some embodiments. In some embodiments, while the variable load 310 is used to reflect small amounts of power back out of the receive antenna 313, a reflect switch 311 is used to reflect all, or a substantial portion, of the received power. The reflect switch 311 could be located at the RFin port, however this would present the same disadvantages as discussed with reference to FIG. 3B-1, which illustrates an example of the variable load 310 coupled to the Rfin port. In some embodiments, these disadvantages are largely mitigated by placing the reflect switch 311 at the DC port (e.g., the Vrect port) of the rectifier 306. In some embodiments, when the reflect switch 311 is OFF, the reflect switch 311 does nothing. When the reflect switch 311 is ON, it presents a very low impedance (e.g., a short circuit) load at the DC side of the rectifier 306. Similarly, a low impedance load is seen at the RFin port of the rectifier 306, which presents a substantial impedance mismatch between the antenna 313 and the rectifier 306. Therefore, when the reflect switch 311 is ON, a substantial percentage of the input power from the antenna 313 is reflected back out of the antenna 313 and does not get converted to DC power by the rectifier 306.

Figure 3D:
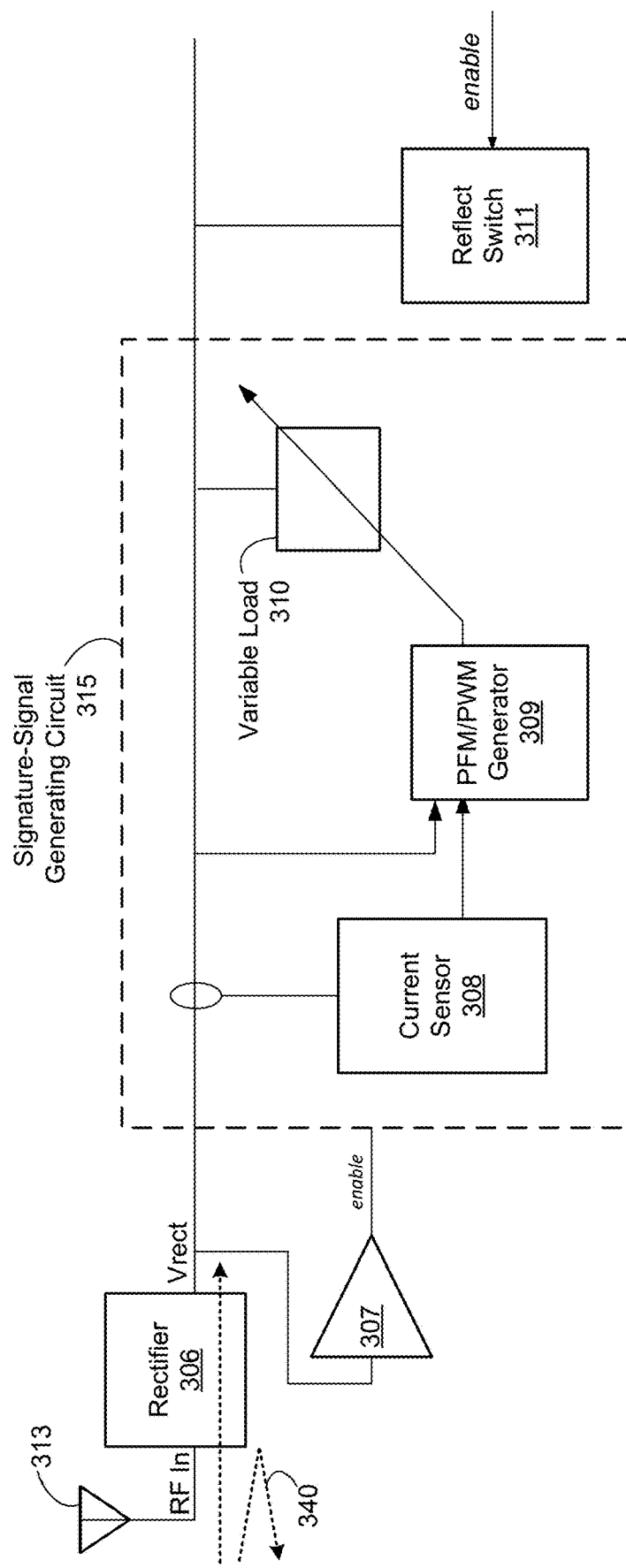
FIG. 3D is a block diagram illustrating an example of a signature-signal generating circuit located at a receiver device in accordance with some embodiments.
Figure 3E:
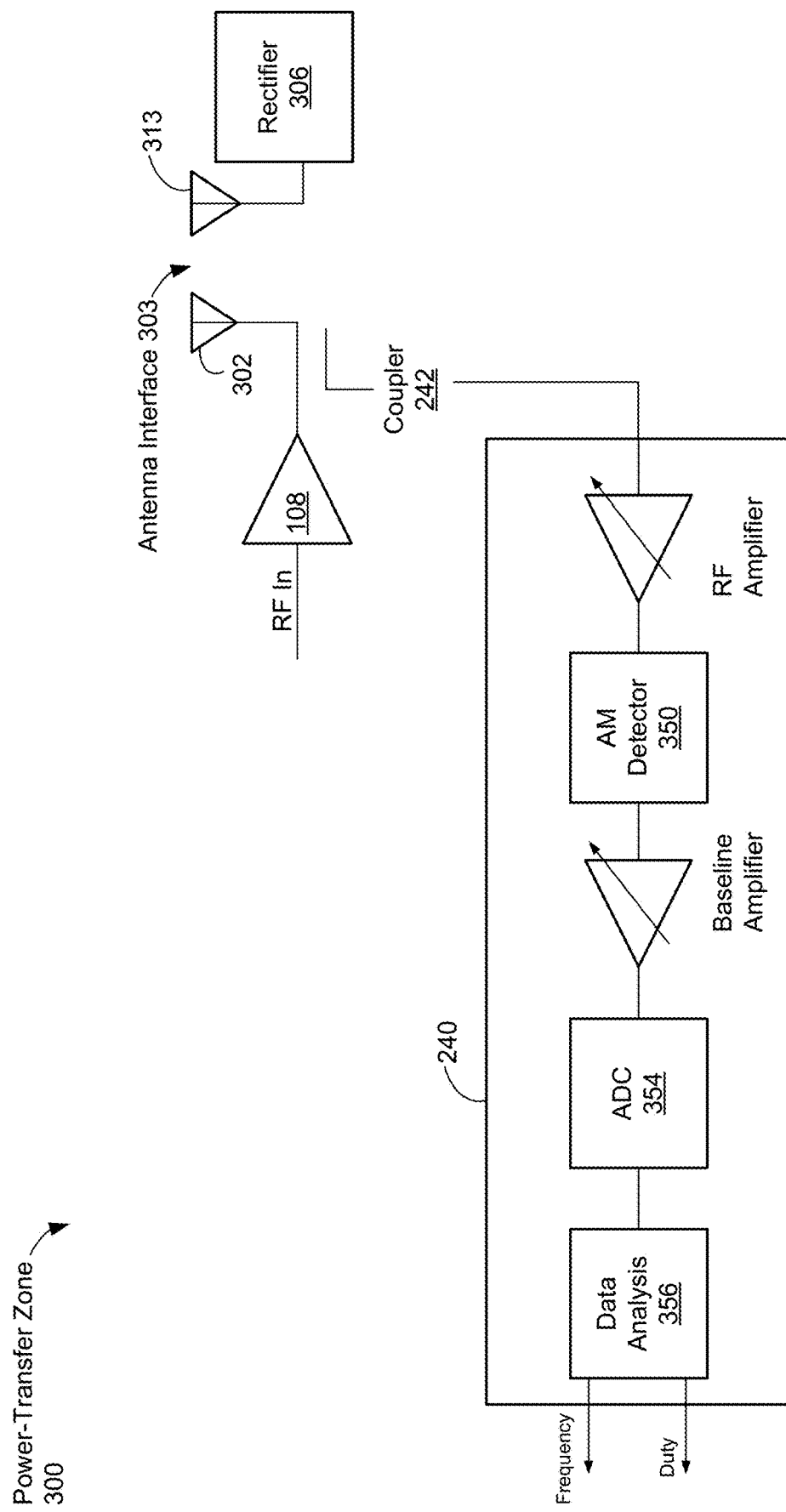
FIG. 3E illustrates a block diagram illustrating an example transmitter circuit including a signature-signal receiving circuit located at a charging pad in accordance with some embodiments.

FIG. 3D is a block diagram illustrating an example of a signature-signal generating circuit 315 of the wireless power receiver 305 in accordance with some embodiments. In some embodiments, the signature-signal generating circuit 315 includes a PFM/PWM (pulse-frequency modulation/pulse-width modulation) generator 309 to control the variable load 310 for generating a valid receiver "signature" (also referred to herein as a signature signal). In some embodiments, the signature-signal generating circuit 315 further includes (or is in communication with) a window comparator 307 to disable the control scheme unless sufficient power is available at Vrect to turn on all the circuitry. In some embodiments, the signature-signal generating circuit 315 further includes a current sensor 308 that converts the rectifier load current into a voltage which is received by the PFM/PWM generator 309. In some embodiments, the PFM/PWM generator 309 also senses Vrect directly. In some embodiments, the reflect switch 311 is also part of the signature-signal generating circuit 315.

In some embodiments, the window comparator 307, current sensor 308, and PFM/PWM generator 309, and any other auxiliary circuitry can be powered by power signals that are transmitted from the power-transfer zone 300, rectified by the rectifier 306, and supplied from the Vrect port, such that the system is independent of the host battery. Thus, even when the host battery of the receiver device 305 is completely dead, the signature-signal generating circuit 315 in the receiver device 305 can still be powered by the power signals received from the power-transfer zone 300 to generate signals with signatures. Such signals with signatures are further reflected back to the power-transfer zone 300 for sampling and analyzing whether there is any foreign object placed between the power-transfer zone 300 and the receiver 305, and/or whether the receiver 305 is authorized to receive power from the power-transfer zone 300 (or the charging pad 100 in general).

In some embodiments, the PWM/PFM generator 309 converts the current sense and voltage sense inputs to a pulse train where the pulse frequency is dependent on the sensed current and the pulse width is dependent on the sensed voltage (or vice versa). In some embodiments, the pulse train is applied to the variable load 310, which therefore represents a pulsed load at the port Vrect, and this pulsed load is upconverted to RF by the rectifier 306 as previously explained. Ultimately, the pulsed load will be sensed by the power-transfer zone 300 for sampling and analyzing.

FIG. 3E illustrates a block diagram that shows an example power-transfer zone 300 including a signature-signal receiving circuit 240 in accordance with some embodiments. In some embodiments, the coupling network impedance is sensed by the reflected power coupler 242. In some embodiments, the reflected power coupler 242 is used to measure the impedance being reflected back from the receiver 305 to the antenna 302 (e.g., antenna 210, FIG. 1B) of the power-transfer zone 300. In some embodiments, due to a mismatch between the power-transfer zone 300 and the receiver 305 caused by an interference from a foreign object or a signal exchange with an authorized receiver, some power signals are being reflected by the receiver 305. A portion of such reflected power signals 340 is received at the power-transfer zone 300's antenna 302, and the impedance is measured by the reflected power coupler 242 at the power-transfer zone 300. After comparing the received reflected power 340 and the original transmitted power, the power-transfer zone 300 can determine an extent of a mismatch between the power-transfer zone 300 and the receiver 305. For example, if $1/10$ of the reflected power 340 received at the power-transfer zone 300 can be sensed by the reflected power coupler 242, and when $1/10$ of the original transmitted power is received at the reflected power coupler 242, it can be determined that the receiver 305 does not take any power signals from the power-transfer zone 300.

In some embodiments, the reflected power signals 340 received from the receiver 305 are processed and analyzed by the signature-signal receiving circuit 240. For example, the received reflected signal 340 is amplified, filtered, and demodulated using an amplitude modulator (AM) detector 350. In some embodiments, an automatic gain control (AGC) is implemented. In some embodiments, after demodulation, the digitally-sampled signals are matched with antenna fingerprint, e.g., by data analysis block 356. In some embodiments, the rectifier loading conditions are sensed. In some embodiments, Message ID is decoded from the received reflected signals as further shown in FIG. 4 (and discussed further below).

Figure 3F:
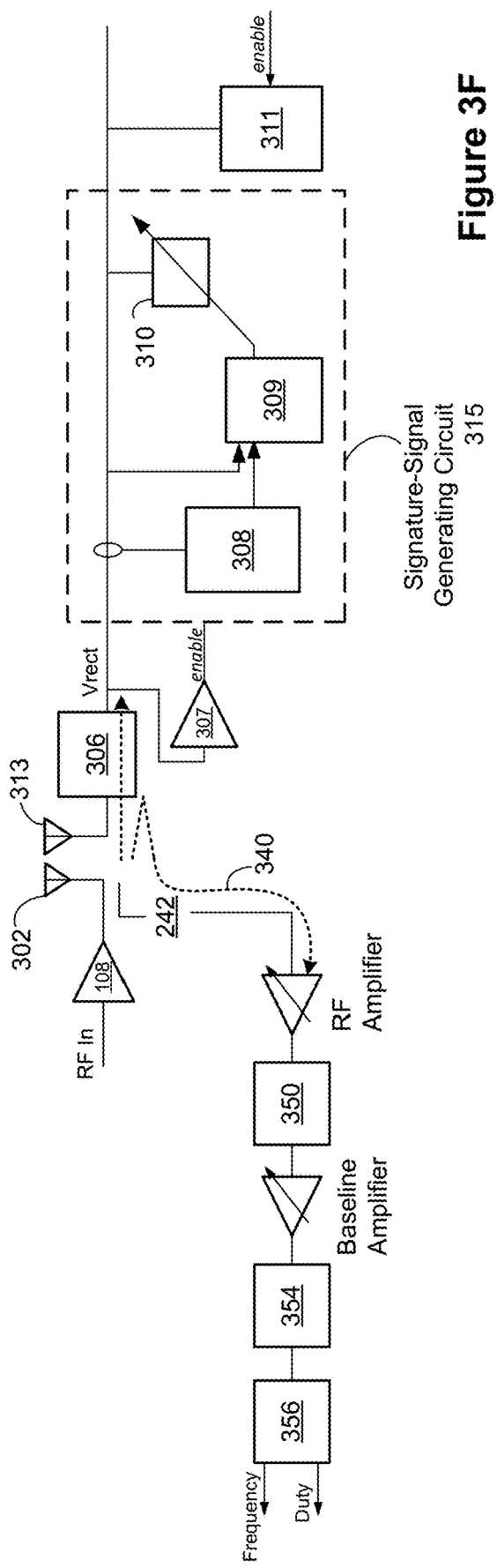
FIGS. 3F-3H show respective block diagrams illustrating various example circuits of wireless transmitters and wireless receivers in accordance with some embodiments.
Figure 3G:
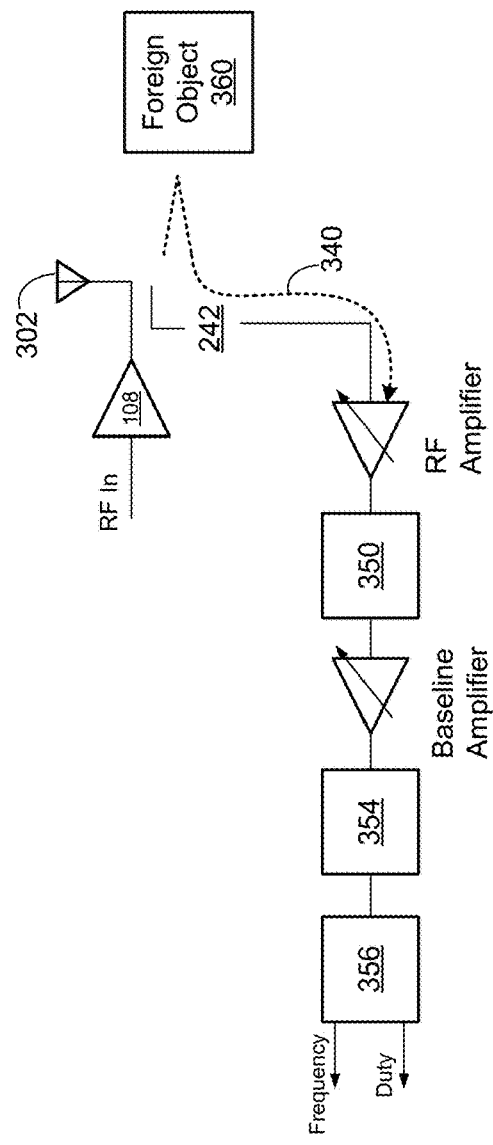
Figure 3H:
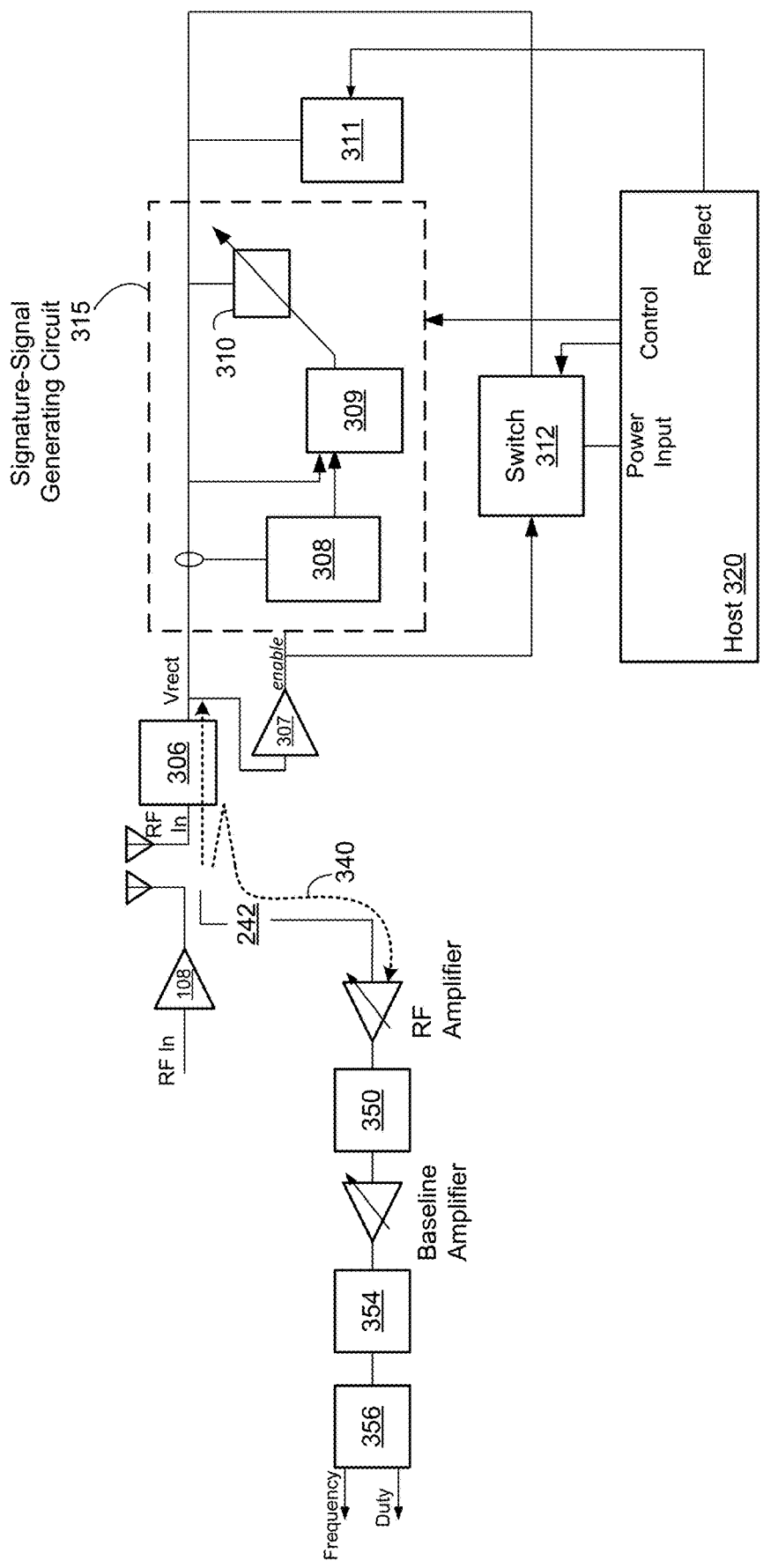

FIGS. 3F-3H show respective block diagrams illustrating various example circuits of power-transfer zones 300 and wireless receivers 305 in accordance with some embodiments. In some embodiments, the pulsed load at RFin modulates the amount of reflected power 340 which propagates out of an antenna 313 of the wireless power receiver 305. In some embodiments, some of this reflected power enters the transmitting antenna 302 (also referred to as a "power-transferring element"), and some of that in turn is coupled into the receive port of the load-modulation receiver on the power-transmitter unit. As discussed below, the reflected power is received using an AM receiver topology with variable gain stages and AGC for optimal SNR adjustment. In some embodiments, if a foreign object 360 is placed on the receiver 305, there is also reflected power from the surface of the foreign object 360, which is also sensed by the AM receiver 350.

In some embodiments, the received data stream is analyzed to extract the receiver signature waveform (its "signature signal"). In some embodiments, if the object is a valid receiver 305, then the signature signal is the PWM/PFM pulse train previously described. Upon correctly decoding the pulse train (or lack thereof), the power-transfer zone 300 can determine the system state from among the following options: 1) no object on top, 2) one or more foreign objects on top, 3) valid receiver only, and 4) foreign object in between receiver and a surface of the RF charging pad.

In some embodiments, upon detection of a wireless power receiver 305, the power-transfer zone 300 may apply several power levels and measure changes in the PWM/PFM pulse train to authenticate an authorized receiver.

In some embodiments, other messages may be passed from the receiver 305 to the power-transfer zone 300 using the "control" pin(s) which can modify load modulation. In some embodiments, the messages received by the power-transfer zone 300 can be sampled and analyzed to obtain informing regarding receiver conditions, such as battery status (e.g., full/dead/other), temperature, rectifier voltage/current, and future intended actions such as intention to turn on the reflect switch 311.

In some embodiments, the transmission of power signals coexists with other wireless protocols. For example, if the host 320 intends to send or receive wireless (Bluetooth, WiFi, LTE, etc.) traffic but cannot because the power-transfer zone 300 is on and is interfering with the Bluetooth system, the host 320 may wish to stop the power-transmission for an interval to clear the wireless traffic, and then continue the power-transmission. Techniques for managing coexistence of power and data signals are described in commonly-owned U.S. Provisional Patent Application 62/579,049, filed on Oct. 30, 2017, which is hereby incorporated by reference in its entirety.

In some embodiments, the host 320 (shown in FIG. 3H) can obtain control of the load modulation using the "control" input. In some embodiments, the host 320 can force certain PWM/PFM combinations which are then interpreted as pre-defined messages by the power-transfer zone 300. Examples of such pre-defined messages are discussed with reference to FIG. 4 below.

In some embodiments, the host 320 controls the reflect switch 311. When the reflect switch 311 is turned on, Vrect is drawn below the window comparator threshold and the PWM/PFM 309 stops. In this case, the power-transfer zone 300 detects the absence of a valid receiver signature. The actions under this scenario are programmable per application. In some embodiments, a switch 312 (i.e., receiver-side switch) to the host power input is controlled via the host 320 and also via the window comparator 307 such that the host 320 cannot overload the rectifier 306 during system startup.

Figure 4:
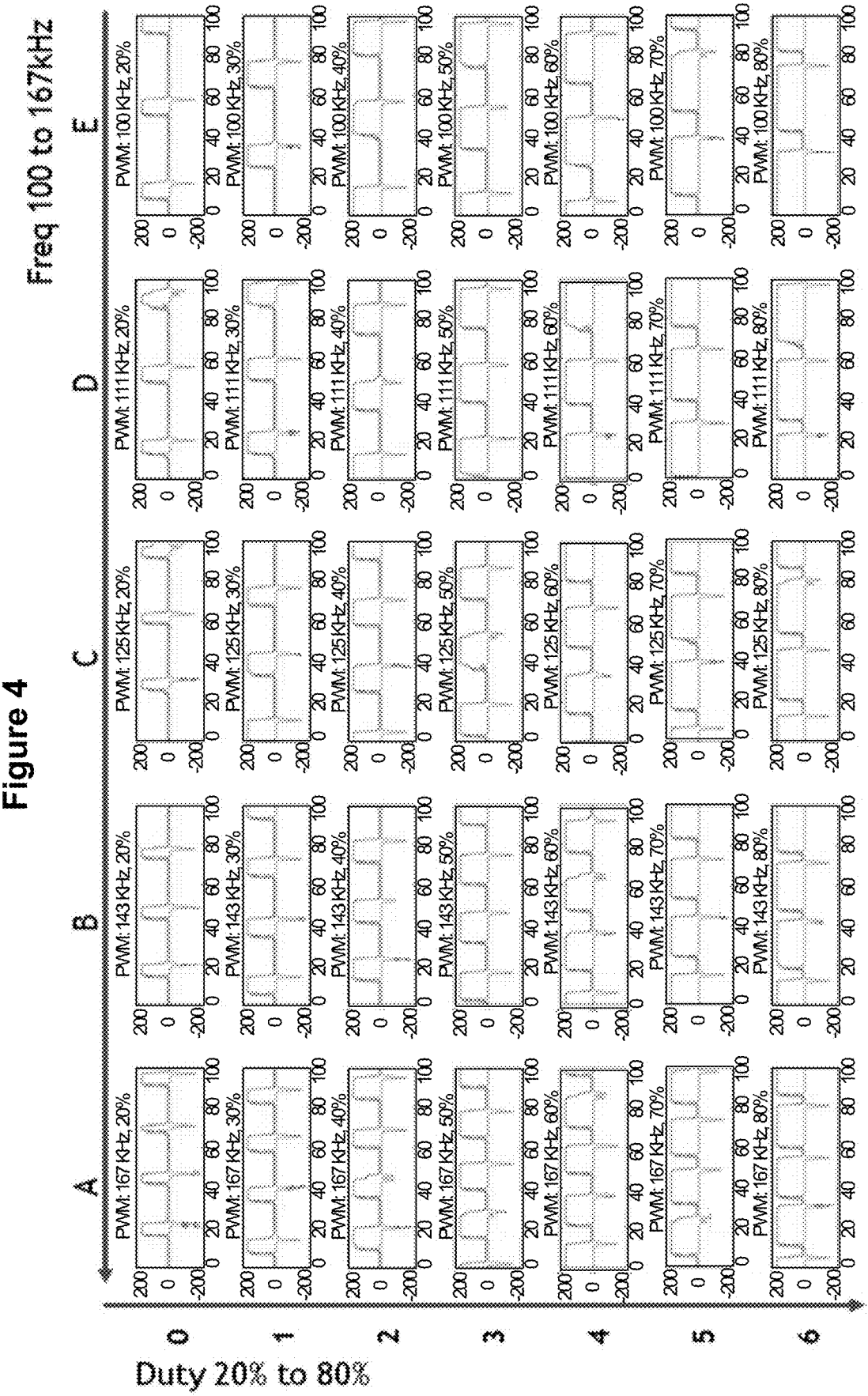
FIG. 4 lists example messages encoded with signature signals in PFM/PWM pairs in accordance with some embodiments.

FIG. 4 lists example messages encoded using signature signals in PFM/PWM pairs, in accordance with some embodiments. In some embodiments, the Frequency/duty pairs (also PFM/PWM pairs) can be selected on the receiver side and interpreted on the transmitter side as passing specific messages. FIG. 4 lists an example plot of 42 frequency/duty pairs, and each pair has a different meaning used to control the power transfer link, implementing coexistence and foreign object detection (FOD). In some embodiments, the PFM/PAM pairs shown in A0-A6 are decoded as a request from the receiver 305 to the power-transfer zone 300 to reduce power by various amounts. In some embodiments, the PFM/PAM pairs shown in B0-B6 are decoded as a request from the receiver 305 to the power-transfer zone 300 to increase power by various amounts. In some embodiments, the PFM/PAM pairs shown in C0-C6 are decoded as a request from the receiver 305 to the power-transfer zone 300 to stop transmitting for various lengths of time then restart, or stop forever.

FIG. 5A illustrates a simplified diagram showing a highly-coupled near-field capacitive coupler 244 (e.g., FIG. 2A) that is used in a power-transfer zone 300 in accordance with some embodiments (e.g., the coupler 244 can be the antenna 302 discussed above with reference to FIGS. 3A-3H). In some embodiments, the highly-coupled near-filed capacitive coupler 244 is coupled to the power amplifier 108 and the signature-signal receiving circuit 240 (FIG. 3A). In some embodiments, the highly-coupled near-field capacitive coupler 244 operates in one of the ISM frequency bands. In some embodiments, no electromagnetic (EM) propagation occurs in the current system. Rather, the wireless power is transmitted and received via capacitive coupling elements between the power-transfer zone 300 and the receiver 305. In some embodiments, the capacitive coupling occurs when two coupling elements (one on transmitter side and one on receiver side) are placed in front of each other in an optimum position when desired stackup is placed between two coupling elements.

In some embodiments, there is no limit on the shape, size, and number of the center coupler 502 and parasitic elements 504. In some embodiments, the parasitic elements 504 can be in the same level as the center coupling element 502 or at a higher or a lower level from the center coupling element 502. In some embodiments, the parasitic elements 504 are placed around the center coupling element 502 to extend X-Y coverage within the planar area of the capacitive coupler 244. In some embodiments, the system is formed as a two-conductor capacitor. In some embodiments, when the coupling elements of the receiver 305 and the power-transfer zone 300 are misaligned, the parasitic elements 504 are effective in forming a multi-conductor capacitive system to maximize the power transfer from the power-transfer zone 300 to the receiver 305. In some embodiments, to measure the reflected RF power to the power amplifier 108, there is a coupler circuitry 242 (in a form of a chip or printed lines, as shown in FIG. 3A) to sample the reflected RF power signals 340. In some embodiments, the capacitive charging coupler 244 includes a reflecting plane.

In some embodiments, when the receiver antenna 313 is placed on top of the transmitting antenna 302 (e.g., one of the capacity charging couplers 244), the system shows coupling efficiency of more than a predetermined threshold value (e.g., a minimum acceptable value, such as 70%). In some embodiments, when the transmitting antenna 302 and receiver antenna 313 are completely standalone, the system is mismatched. As soon as these antennas are placed on top of each-other, both antennas get matched. In some embodiments, the coupling system only works when the designed receiver is placed on top of the transmitting antenna 302. In case of a foreign object 360 being placed on top of the power-transfer zone 300, the transmitting antenna 313 is not matched. Such mismatch induced by a foreign object 360 can be used to detect a foreign object 360 placed between the power-transfer zone 300 and the receiver 305.

In some embodiments, the coupling between the receiver 305 and the power-transfer zone 300 reaches a peak when the receiver antenna 313 and the transmitting antenna 302 are fully aligned/centered (e.g. 90%). In some embodiments, as the receiver antenna 313 moves over the transmitting antenna 302, the coupling performance drops, but it remains within an acceptable range (e.g. stays within 70-90%). In some embodiments, when receiver antenna 313 moves outside the minimum coupling range (e.g. 70%), the second/adjacent transmitting antenna 302 gets activated for a smooth transition.

In some embodiments, both transmitter and receiver antennas are mismatched, and when the correct placement occurs, both transmitting antenna 302 and receiver antenna 313 get matched and the maximum power can be obtained from transmitting antenna 302 to receiver antenna 313. In some embodiments, highly-coupled near field antenna pairs only work in presence of each other. Therefore, in presence of other types of receiver antennas and/or any other foreign objects, the transmitting antenna 302 stays mismatched.

Figure 5B:
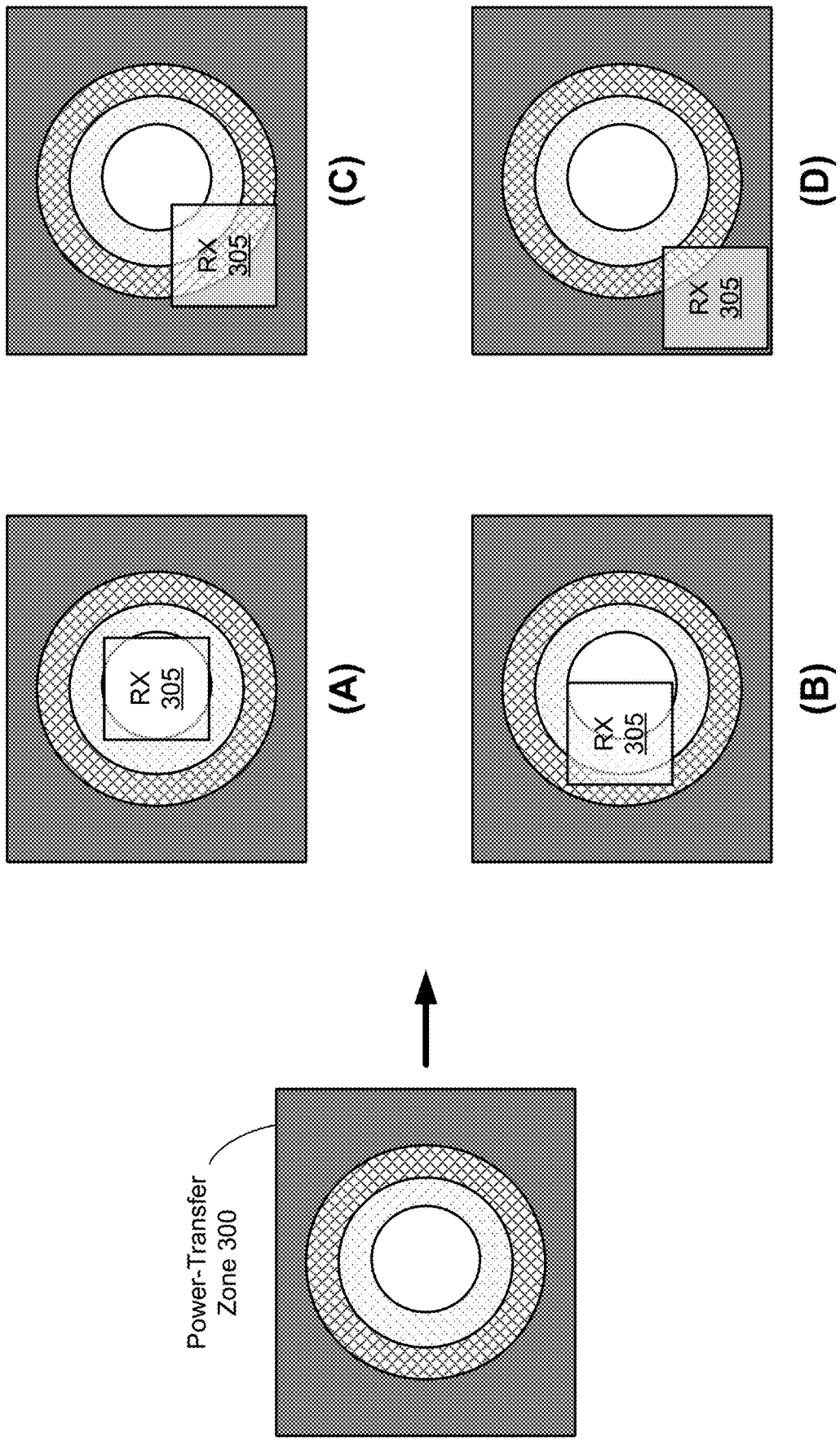
FIG. 5B shows a plurality of efficiency maps corresponding to various embodiments when the receiver is placed over different regions of a transmitter in accordance with some embodiments.

FIG. 5B shows a plurality of efficiency maps corresponding to various embodiments when the receiver 305 is placed over different regions of a power-transfer zone 300 that includes one or the couplers 244 in accordance with some embodiments. In some embodiments, highly-coupled antenna pairs can be treated as state-machines. In some embodiments as shown in FIG. 5B, the power-transfer zone 300 includes multiple areas with respective charging efficiencies when a receiver 305 is displaced on top of the corresponding areas. When the receiver 305 is placed on top of the white zone (efficiency>90%) of the power-transfer zone 300 (A—top-left map), the matching of both the receiver 305 and power-transfer zone 300 is better than −15 dB. When the receiver 305 is placed on top of the stippled zone (80%<efficiency<90%) of the power-transfer zone 300 (B—bottom-left map), the matching of both the receiver 305 and power-transfer zone 300 is in a range of −10 dB to −15 dB. When the receiver 305 is placed on top of the cross-hatched zone (70%<efficiency<80%) of the power-transfer zone 300 (C—top-right map), the matching of both the receiver 305 and power-transfer zone 300 is in a range of −5 dB and −10 dB. When the receiver 305 is placed on top of the darker zone (efficiency<70%) of the power-transfer zone 300 (D—bottom-right map), the matching of both the receiver 305 and power-transfer zone 300 is worse than −5 dB.

Figure 6A:
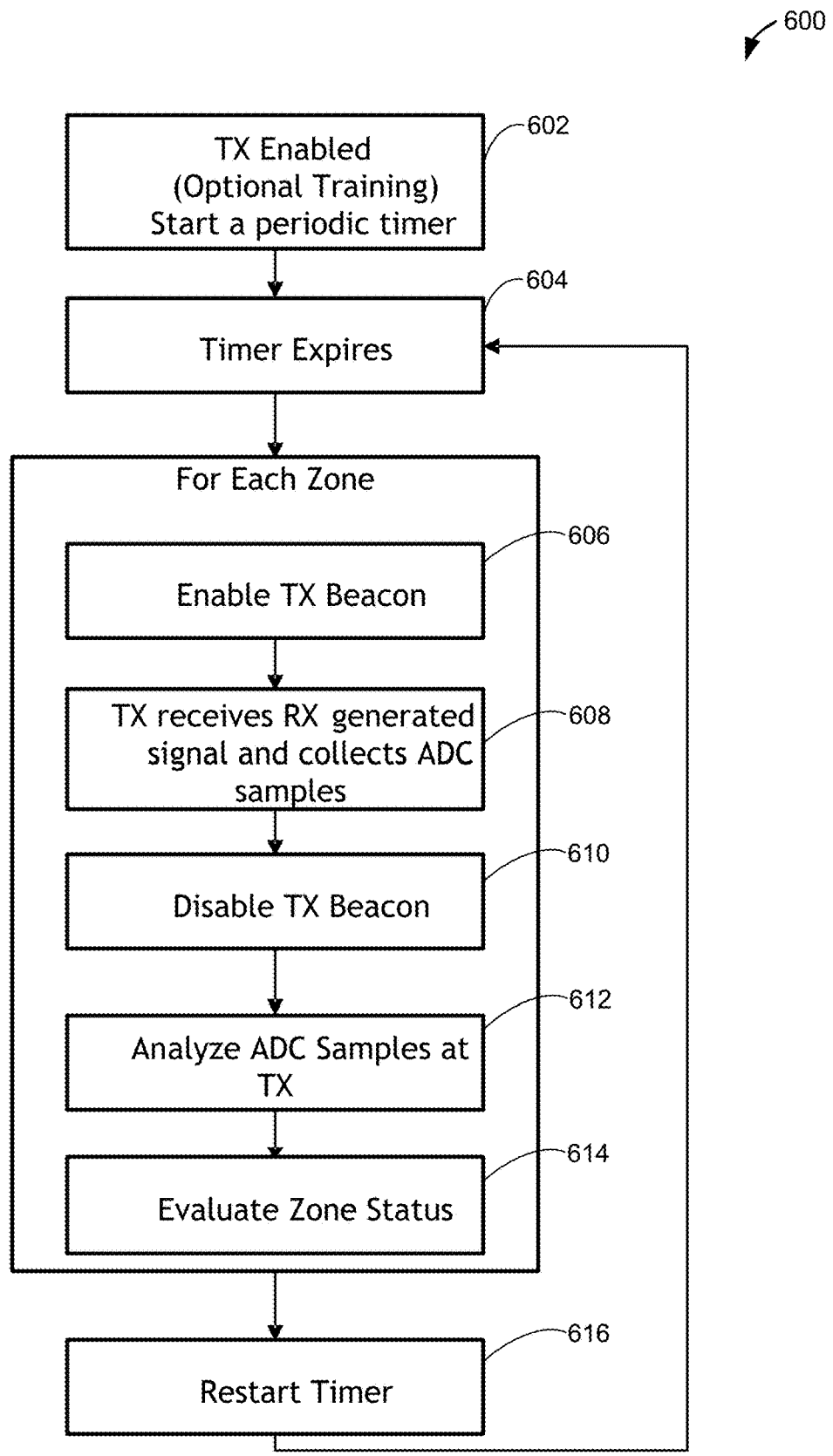
FIG. 6A is a flow diagram showing a process of detecting a receiver by sending beacon signals periodically in accordance with some embodiments.

FIG. 6A is a flow diagram 600 showing a process of detecting a receiver 305 by sending beacon signals (also referred to herein as "test power transmission signals") periodically in accordance with some embodiments. In some embodiments, each power-transfer zone starts (602) a timer so as to send beacon signals periodically. In some embodiments, when the timer expires (604), each power-transfer zone of the NF charging pad (also referred to herein as an RF charging pad) 100 sends a beacon signal (606). The signature-signal generating circuit 315 of the receiver 305 (e.g., as discussed in FIGS. 3A and 3E) can generate signature-signals based on the beacon signal. Thereafter, each power-transfer zone receives (608) the receiver 305 generated signature-signals and collects analog-to-digital converter 354 (ADC) samples. The transmitter beacon signal is disabled (610), the samples from ADC 354 are analyzed (612), and the zone status is evaluated (614) (e.g., as discussed with reference to FIG. 5B). After the zone status is determined and the matching between each respective zone and the receiver 305 is evaluated, the timer is restarted (616) to start the next period for sending beacon signals. In some embodiments, the start step (602) includes an optional training process as discussed with reference to FIG. 6B (and in more detail below in reference to FIG. 9A).

Figure 6B:
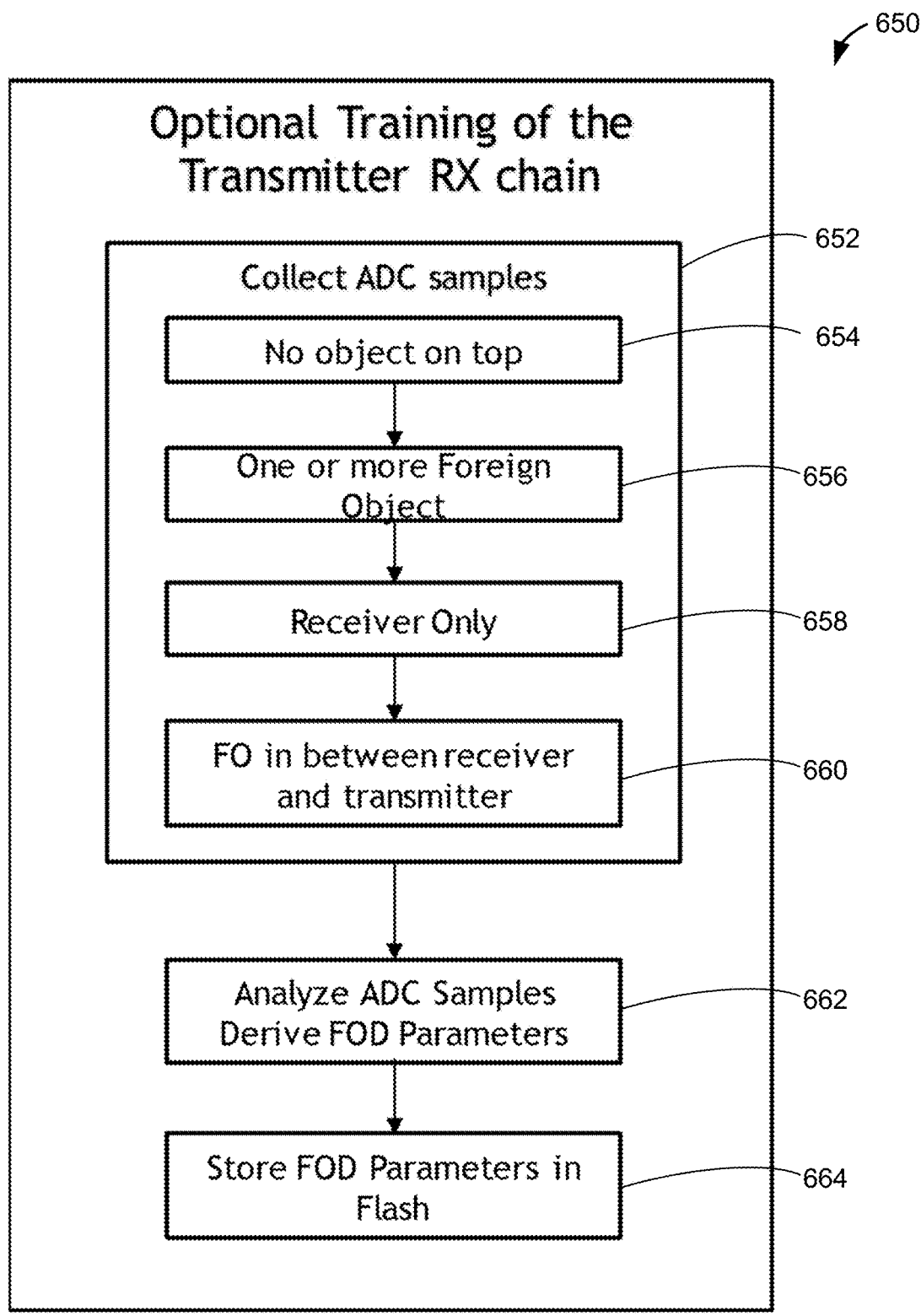
FIG. 6B is a flow diagram showing a process of optional training performed by a transmitter in accordance with some embodiments.

FIG. 6B is a flow diagram 650 showing a process of optional training performed by the power-transfer zone 300 in accordance with some embodiments. In some embodiments, optional training is an embodiment for aiding foreign object detection (FOD) using signature-signal-based detection. In some embodiments, this can be done at one time with known sets of receivers and FOD devices. In some embodiments, enough ADC samples are collected (652) to enable classification of FOD, and the derived parameters provide the ability to classify the object detection status including (1) no object present (654), (2) one or more foreign objects present (654), (3) receiver only present (658), and (4) foreign object in between receiver 305 and power-transfer zone 300 (660). The process further includes analyzing (662) ADC samples to derive FOD parameters, and storing (664) the FOD in memory (e.g., in non-volatile memory). More details regarding example training/learning processes are described below in reference to FIG. 9A.

Figure 7:
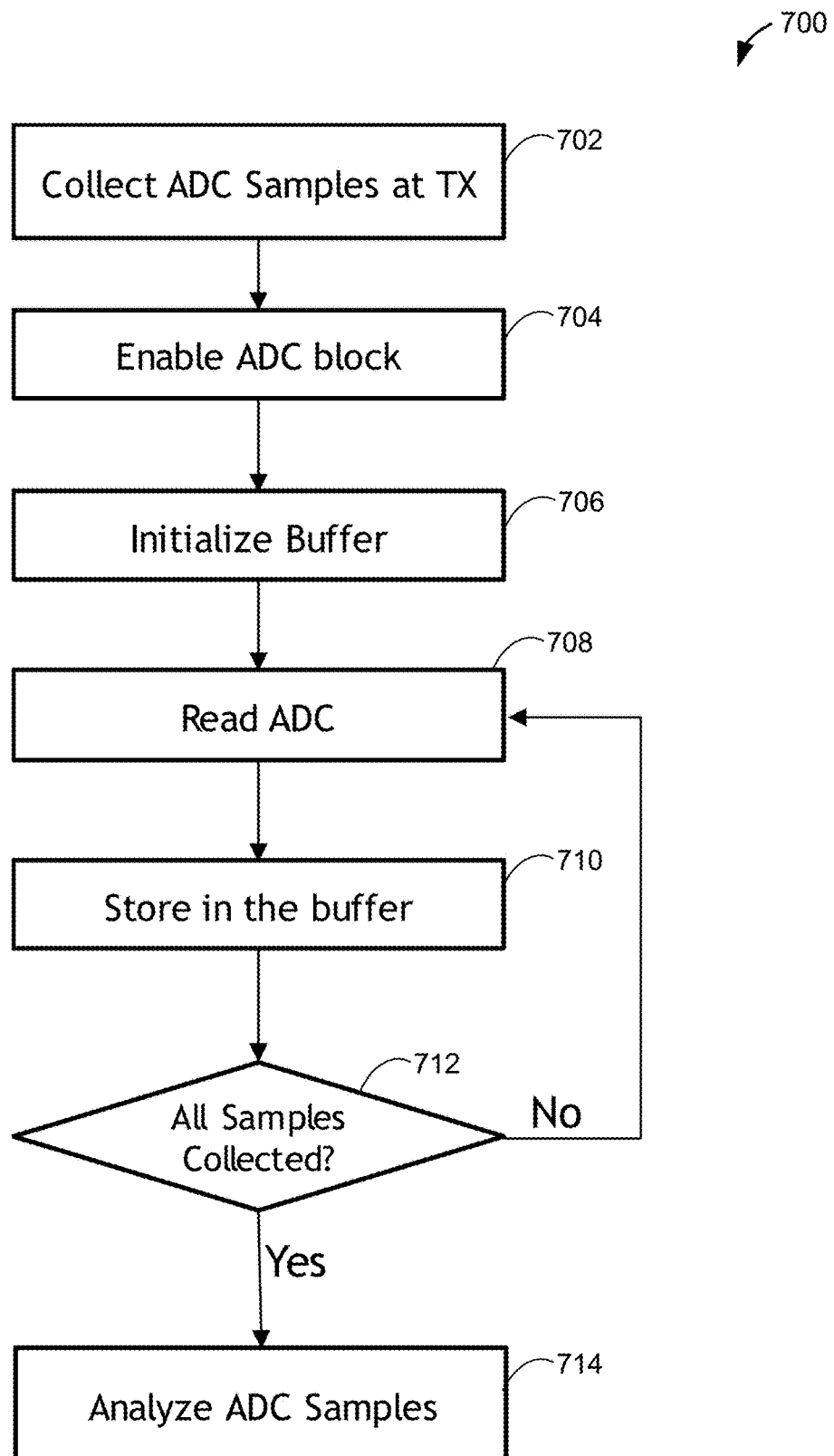
FIG. 7 is a flow diagram showing a process of collecting, storing, and analyzing ADC samples performed by a transmitter in accordance with some embodiments.

FIG. 7 is a flow diagram 700 showing a process of collecting, storing, and analyzing ADC samples performed by the power-transfer zone 300 in accordance with some embodiments. In some embodiments, collecting the ADC samples begins at a step 702, and sampling may continue as a preconfigured tight loop in firmware. In some embodiments, firmware runs an optimized loop to collect and store the ADC data in a buffer, which includes enabling (704) the ADC block, initializing (706) the buffer, reading (708) the ADC for data, storing (710) the collected data (e.g., ADC samples) in the buffer. Next, it is determined whether all the ADC samples are collected (712). If all the ADC samples are collected (712—Yes), then the samples are analyzed (714). However, if all the samples are not collected (712—No), then the process 700 loops back to the reading the ADC (step 708). This can be subjected to timing variation and result in inaccuracies. These variations can be minimized by collecting samples multiple times and averaging to remove the noise.

In some embodiments, operation 702 is hardware (HW) assisted. For example, at operation 702 hardware is used to sample the ADC values at fixed intervals in a pre-defined buffer. Once all the samples are collected, firmware will be notified and subsequent operations shown in FIG. 7 may continue. This guarantees tight timing for sampling and gives more accurate result. Also the firmware is not blocked in a dead loop of collecting samples.

Figure 8A:
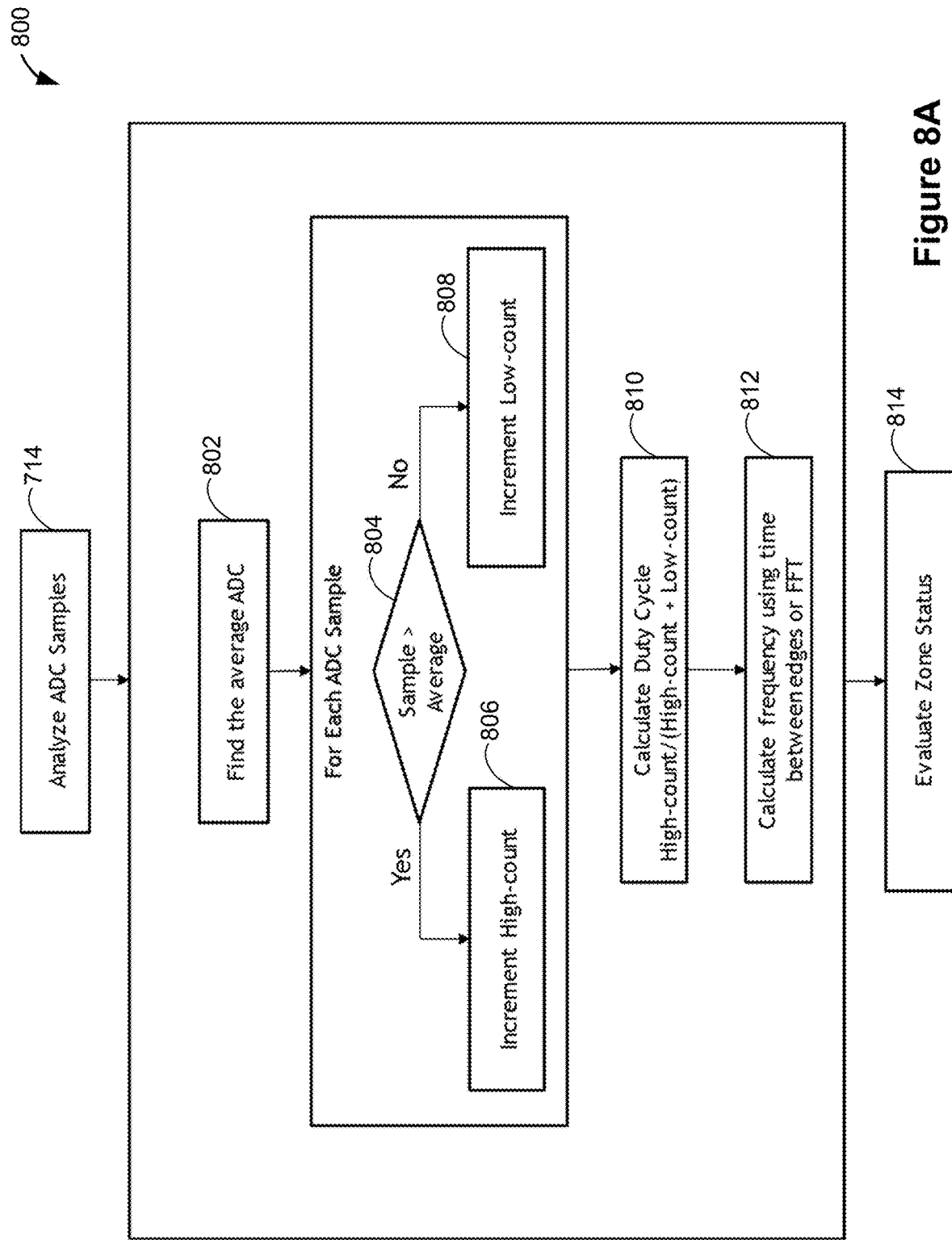
FIG. 8A is a flow diagram showing a process of analyzing ADC samples performed by a transmitter in accordance with some embodiments.

FIG. 8A is a flow diagram 800 showing a process of analyzing ADC samples performed by a power-transfer zone 300 in accordance with some embodiments. In some embodiments, after the ADC samples are collected (714), a baseline of the collected ADC samples is determined. In one example, the average of the collected ADC samples is determined (802). Then each ADC sample is compared against the determined baseline, e.g., the average of the collected ADC samples (804). When an ADC sample is greater than the calculated average (804—Yes), a high-count is incremented (806). When an ADC sample is lower than the calculated average (804—No), a low-count is incremented (808). Then a duty cycle is calculated (810) by: high-count/(high-count+low-count), and a frequency is calculated (812) using time between edges of Fast Fourier transform (FFT). The calculated duty cycle and the frequency are used for evaluating zone status (814) as discussed with reference to FIG. 8B.

Figure 8B:
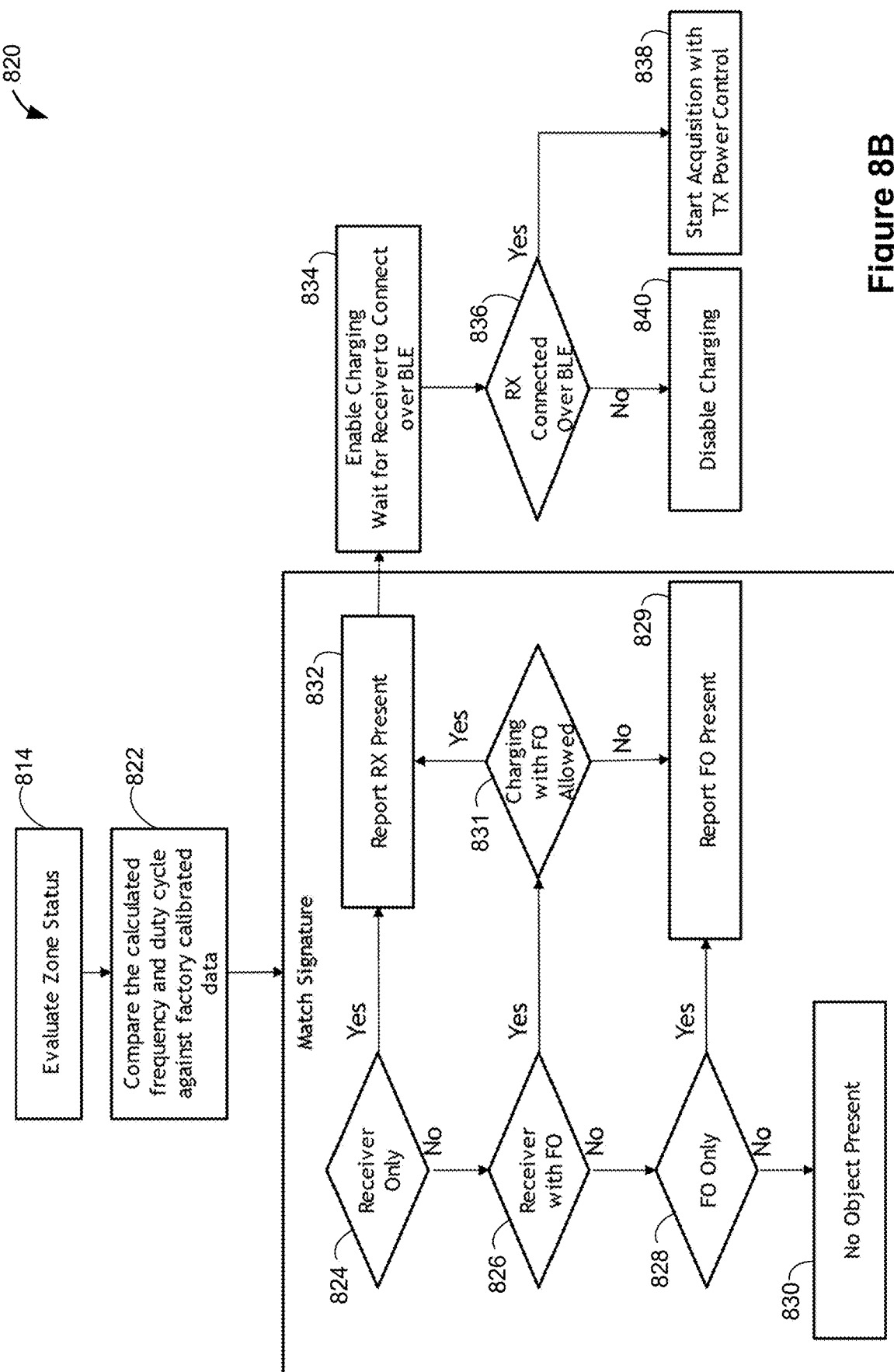
FIG. 8B is a flow diagram showing a process of evaluating zone status to determine whether there is a foreign object and/or a receiver in accordance with some embodiments.

FIG. 8B is a flow diagram 820 showing a process of evaluating zone status (814) to determine whether there is a foreign object and/or a receiver present in accordance with some embodiments. In some embodiments, the calculated frequency and duty cycle are compared (822) against factory-calibrated data. It is then determined whether only a receiver is present (824). In accordance with a determination that only a receiver is present (824—Yes), the presence of the receiver is reported (832) and the charging of the receiver by the antenna zone (e.g., by the power-transfer zone 300) is enabled (834). In some embodiments, the system waits (836) for the receiver to connect over Bluetooth. When the receiver is connected over Bluetooth (836—Yes), the wireless power signals are acquired from the transmitter power control (838). When the receiver is not connected over Bluetooth (836—No), the charging of the receiver is disabled (840).

In some embodiments, when it is determined that a receiver is present, it is also determined whether a foreign object is present with the receiver. In some embodiments, when a receiver 305 and a foreign object 360 are identified (826), the charging of the receiver with the foreign object is allowed (831); and, then the charging process can be enabled. In some embodiments, when only foreign object is detected (828), the presence of the foreign object is reported (829). In some embodiments, when no foreign object is detected, it is determined that no object (830), e.g., neither a receiver nor a foreign object, is present.

Figure 9A:
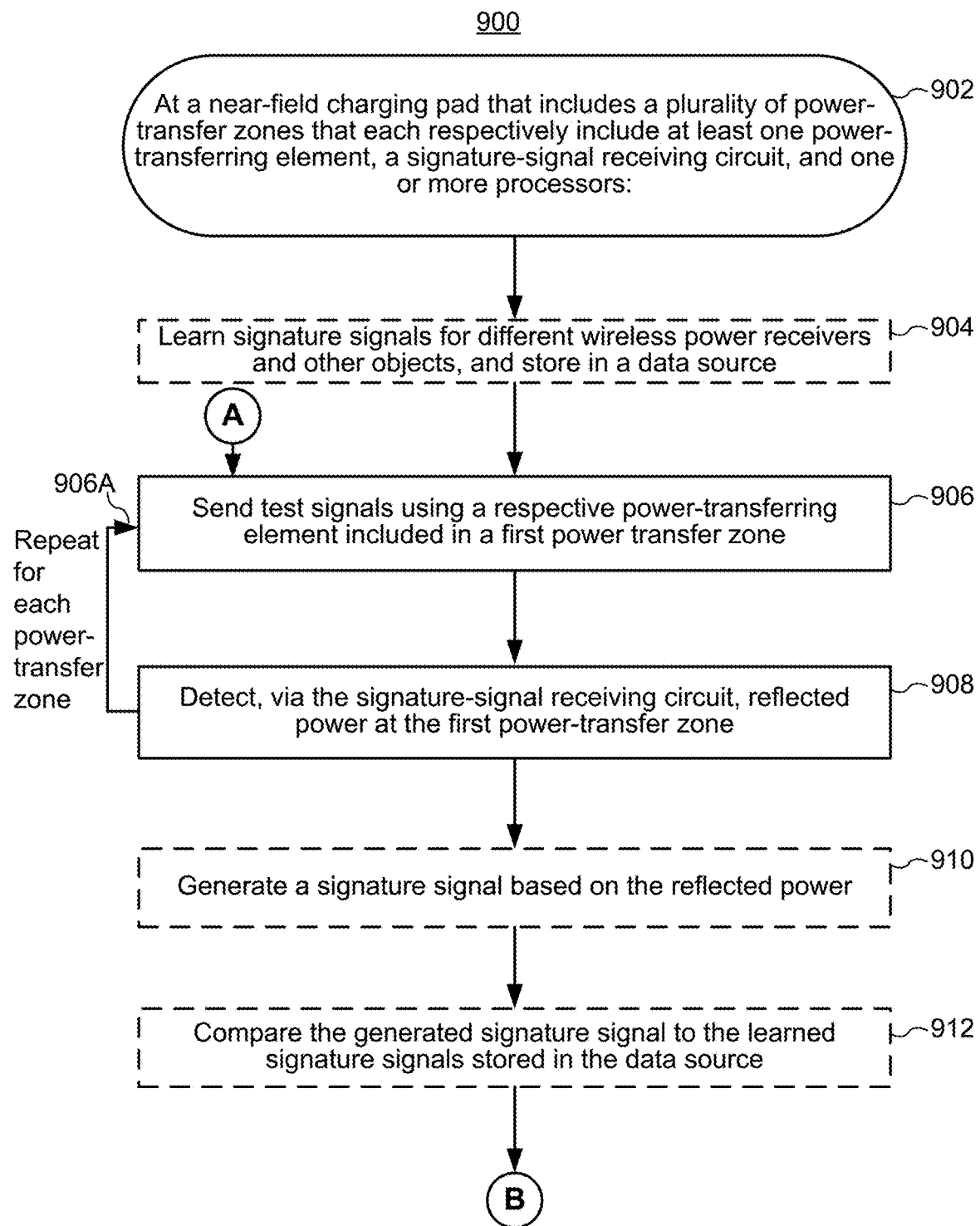
FIGS. 9A-9B are flow diagrams showing a method of operating a near-field charging pad, in accordance with some embodiments.
Figure 9B:
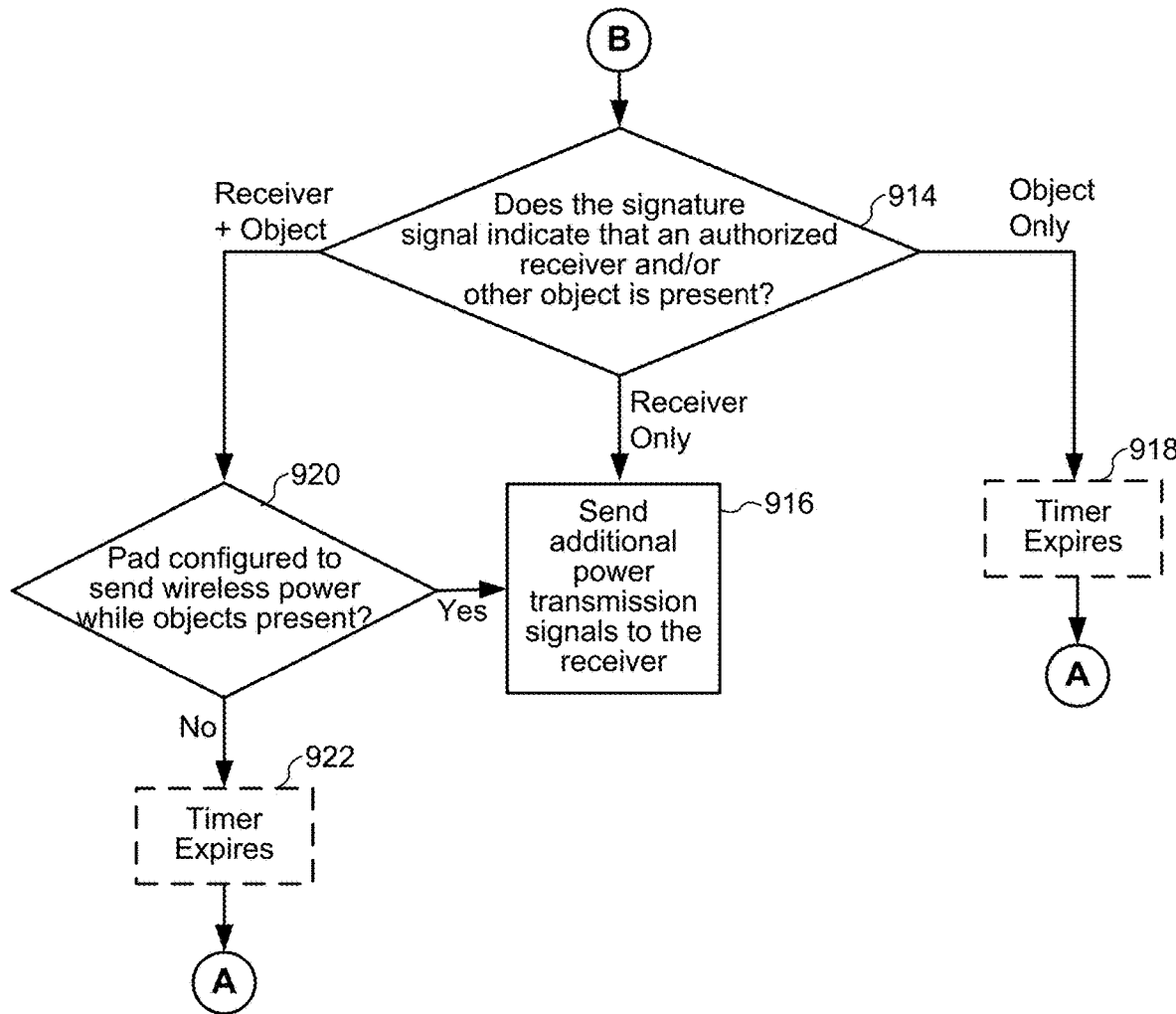

FIGS. 9A-9B are flow diagrams showing a method 900 of operating a near-field charging pad, in accordance with some embodiments. Operations of the method 900 are performed by a near-field charging pad (e.g. RF charging pad 100, FIGS. 1B and 2A) or by one or more components thereof (e.g., those described above with reference to FIGS. 1A-1B and 2A). In some embodiments, the method 900 corresponds to instructions stored in a computer memory or computer-readable storage medium (e.g., memory 206 of the RF charging pad 100, FIG. 2A).

The near-field charging pad includes one or more processors (e.g., CPU 202, FIG. 1B), a wireless communication component (e.g., communication component(s) 204, FIGS. 1A and 2A), and a plurality of power-transfer zones (e.g., antenna zones 290-1 and 290-N, FIG. 1B; power-transfer zone 300, FIG. 3A) that each respectively include at least one power-transferring element (e.g., one of antennas 210, FIG. 2A, which may be one of the antennas 120 described in reference to FIGS. 3A-6E in commonly-owned PCT Application No. PCT/US17/65886, which was incorporated by reference above, the antennas 210 may also be one or more of the capacitive couplers 244 described above in reference to FIG. 5A) and a signature-signal receiving circuit (e.g., the circuit 240 described above in reference to FIGS. 2A, 3A and 3E-3H, and the signature-signal receiving circuit may also include a reflected power coupler 242) (902).

In some embodiments, the near-field charging pad includes distinct power-transferring elements that are each included in respective power-transfer zones. For example, as shown in FIG. 1B, an antenna zone 290-1 includes an antenna 210-A. In another example, as is also shown in FIG. 1B, an antenna zone 290-N includes multiple antennas. The antenna zones may also be referred to as antenna groups, such that the near-field charging pad includes a plurality of antenna/power-transfer zones or groups, and each respective zone/group includes at least one of the distinct antenna elements (e.g., at least one antenna 210). It should be noted that an antenna/power-transfer zone can include any number of antennas, and that the numbers of antennas associated with a particular antenna/power-transfer zone may be modified or adjusted (e.g., the CPU subsystem 170 of RF power transmitter integrated circuit 160 responsible for managing operations of the near-field charging pad 100 dynamically defines each antenna/power-transfer zone at various points in time). In some embodiments, each antenna/power-transfer zone includes a same number of antennas/power-transferring elements.

In some embodiments, the one or more processors are a component of a single integrated circuit (e.g., RF power transmitter integrated circuit 160, FIG. 1B) that is used to control operation of the near-field charging pad. In some embodiments, the one or more processors and/or the wireless communication component of the near-field charging pad is/are external to the near-field charging pad, such as one or more processors of a device in which the near-field charging pad is embedded. In some embodiments, the wireless communication component is a radio transceiver (e.g., a BLUETOOTH radio, WI-FI radio, or the like for exchanging communication signals with wireless power receivers).

In some embodiments and with reference to FIG. 9A, the method 900 includes optionally learning (904) signature signals for different wireless power receivers (e.g., receiver 305, FIG. 3A) and for other objects (e.g., foreign object 360, FIG. 3G), and these learned signature signals are stored in a data source (which may be a local memory of the near-field charging pad or which may be hosted externally to the near-field charging pad).

In some embodiments, the one or more processors of the near-field charging pad are in communication with the data source into which each of the learned signature signals is stored. The data source may be hosted internally or externally to the near-field charging pad. In some embodiments, the data source is populated with the one or more predefined signature signals during a configuration process in which each of a plurality of different wireless power receivers is placed on the near-field charging pad to allow the near-field charging pad to detect and then store (in the data source) a respective predefined signature signal for each of the plurality of different wireless power receivers. In some embodiments, after a respective signature signal is learned for a respective wireless power receiver of the different wireless power receivers, a user may provide an indication as to whether the respective wireless power receiver is an authorized wireless power receiver or not. In this way, the near-field charging pad is able to learn signature signals for both authorized and unauthorized wireless power receivers.

In some embodiments, the configuration process also includes placing a plurality of different objects (e.g., keys, coins, various types of liquids, credits cards, coffee mugs, or any other type of household object that a user might place on the near-field charging pad), which are not wireless power receivers, on the near-field charging pad to allow the near-field charging pad to detect and then store (in the data source) a respective predefined signature signal for each of the plurality of different objects.

In some embodiments, during this configuration process, identifiers for each of the different objects are also stored with each of the respective stored signature signals, thereby allowing the near-field charging pad to identify different types of objects based on matching a signature signal to one of the stored signals.

In some embodiments, during the configuration process, signature signals are also learned for combinations of the different wireless power receivers and the plurality of different objects (e.g., each of the different objects may be placed underneath or on top of each of the different wireless power receivers), and these signature signals are also stored in the data source.

Certain implementations of the near-field charging pad may be implemented so that detection of one of the different objects causing the near-field charging pad to cease any transmission of power. In this way, potential damage to any of the different objects may be avoided.

The method 900 also includes sending (906), by a respective power-transferring element included in a first power-transfer zone of the plurality of power-transfer zones, a plurality of test power transmission signals (also termed beacon power transmission signals) with first values for a first set of transmission characteristics. In some embodiments, the first values for the first set of transmission characteristics include a power level for each of the plurality of test power transmission signals that is less than a certain power threshold (e.g., 30 dB).

In some embodiments, the sending operation 906 is performed based on a predefined time interval, such that at every predefined time interval the test power transmission signals are sent by the first power-transfer zone. In some embodiments, the predefined time interval is 1 second, 2 seconds, or 5 seconds, or some value therebetween. In some embodiments, the near-field charging pad includes a data-communication radio (e.g., a wireless communication component 254, such as a BLUETOOTH radio), and the sending of the plurality of test power transmission signals is performed without receiving any signal via the data-communication radio.

In other words, by allowing the method 900 to begin without requiring receipt of any signal via the data-communication radio, the method 900 is used to detect that an authorized receiver is present on the near-field charging pad even when that receiver has no charge in its power sources (e.g., its battery is completely drained). Additionally, the method 900 is also used to detect authorized receivers on the pad which do not have any data-communication radios at all.

In conjunction with sending each of the plurality of test power transmission signals, the method also includes detecting (908), using the signature-signal receiving circuit, respective amounts of reflected power (e.g., reflected signals 340, FIG. 3F) at the first power-transfer zone. The respective amounts of reflected power may include amounts of power from each of the test power transmission signals that are reflected back to the first power-transfer zone. As is discussed in more detail below, these respective amounts of reflected power may be used to allow the near-field charging pad to determine whether an authorized wireless power receiver is located on the near-field charging pad.

Based at least in part on the respective amounts of reflected power, the method 900 then includes determining whether (i) an authorized wireless power receiver and/or (ii) an object other than a wireless power receiver is present on a surface of the near-field charging pad that is adjacent to the first power-transfer zone (e.g., a surface of the pad that is immediately above the first antenna zone). In some embodiments, this determination is based at least in part on the respective amounts of reflected power, because the near-field charging pad generates (910) a signature signal based on the respective amounts of reflected power (e.g., an example way to generate the signature signals based on the reflected amount of power is shown in FIGS. 3F-3H, 6A-6B, 7, and 8A-8B) and then compares (912) the generated signature signal to the learned signature signals stored in the data source.

In some embodiments, the signature signal is conveyed to the signature-signal receiving circuit of the first power-transfer zone by encoding the one or more signature signals using manipulations to an impedance value(s) at the wireless power receiver, the manipulations to the impedance value(s) causing the amounts of reflected power to vary at different points in time.

In some embodiments, the manipulations to the impedance value cause the signature-signal receiving circuit to detect variations in the measurements of reflected power and these variations may be decoded to produce the one or more signature signals. In some embodiments, the one or more signature signals comprise a combination of frequency and duty cycle values. An example as to how this may work is described with reference to FIGS. 3F-3H, 4, and 8A-8B. In some embodiments, in addition to conveying information regarding whether a wireless power receiver is authorized to receive power from the pad, the one or more signature signals may also be used to convey additional data or messages to the pad. Examples as to how data may be encoded using the signature signals are shown in FIGS. 3F-3H, 4, and 8A-8B.

Turning now to FIG. 9B, the method 900 includes determining (914) whether the signature signal indicates that an authorized receiver and/or any other object (that is not a wireless power receiver) is present on a surface of the first power-transfer zone.

In accordance with a determination that the signature signal indicates that both a receiver and some other object (which is not a wireless power receiver) are present on the surface of the first power-transfer zone, the method 900 then includes determining (920) whether the near-field charging pad is configured to send wireless power while objects (which are not wireless power receivers) are present on the pad.

If it is determined that the pad is configured to send wireless power while objects (which are not wireless power receivers) are present on the pad (920—Yes), then the method 900 includes sending (916), via the power-transferring element, additional power transmission signals with second values for the first set of transmission characteristics to the authorized wireless power receiver.

If it is determined that the pad is not configured to send wireless power while objects (which are not wireless power receivers) are present on the pad (920—No), then the method 900 includes waiting for a timer to expire (922), e.g., waiting for a period of a second or two seconds to pass) and then returning to operation 906 of FIG. 9A.

An additional example of detecting a wireless power receiver and some other object on the surface of the first power-transfer zone is provided below. In this example, the determination (914-Receiver+Object) that both a wireless power receiver and some other object are present on the surface of the first power-transfer zone is based on the comparison (912) of the signature signal with the one or more predefined signature signals stored in the data source. In this example, the method 900 then determines that the near-field charging pad is configured to send power transmission signals while an object other than a wireless power receiver is present on the near-field charging pad; and, after determining that the near-field charging pad is configured to send power transmission signals while an object other than a wireless power receiver is present on the near-field charging pad, the power-transferring element of the first power-transfer zone is then used to send the additional power transmission signals.

In some embodiments, different, third values for the first set of transmission characteristics are used to send the additional power transmission signals when it is determined that an object other than a wireless power receiver is present on the pad. For example, a power level of the additional power transmission signals may be lowered (relative to a power level that is used for the second values for the first set of transmission characteristics) to avoid any potential damage to the object other than the wireless power receiver (e.g., to avoid damaging or destroying a magnetic strip present on a credit card).

Referring back to FIG. 9B, when it is determined at operation 914 that only an authorized receiver is present on the surface of the first power-transfer zone (914-Receiver Only), then the method proceeds to send, via the power-transferring element, additional power transmission signals with the second values for the first set of transmission characteristics to the authorized wireless power receiver. One specific example of detecting just a receiver is also provided below. In this example, and as was discussed in reference to operations 910 and 912, the detected amounts of reflected power at the first power-transfer zone may be used to then determine, using the signature-signal receiving circuit, the signature signal based at least in part on the respective amounts of reflected power at the first power-transfer zone. An example process for collecting measurements of reflected power and collecting the one or more signature signals is shown in FIGS. 8A-8B.

In this example, the method 900 also includes determining, based on a comparison of the signature signal with one or more predefined signature signals, that only an authorized wireless power receiver is present on the surface of the near-field charging pad that is adjacent to the first antenna zone. In some embodiments, the authorized wireless power receiver includes a signature-signal generating circuit (e.g., circuit 315, FIG. 3A) that uses power harvested from the plurality of test power transmission signals to generate the one or more signature signals (as is described in more detail in reference to FIGS. 3A-3D and 3F-3H). In this example, in accordance with the determining that only the authorized wireless power receiver is present on the surface, the method 900 further includes transmitting, by the respective power-transferring element included in the first antenna zone, additional power transmission signals with the second values for the first set of transmission characteristics.

In some embodiments, the signature-signal receiving circuit (e.g., circuit 240, FIG. 3A) at the first power-transfer zone is configured to detect measurements of reflected power at the first antenna zone and these measurements may change based on the presence or absence of objects on a surface adjacent to the first antenna zone (e.g., a surface of the pad that is immediately above the first antenna zone). Additionally, the signature-signal generating circuit may be configured to cause impedance changes at the wireless power receiving, which allows for the generation of different signature signals by the signature-signal generating circuit and, thereby, to cause the receipt of the different signature signals at the signature-signal receiving circuit of the first antenna zone. As discussed above (e.g., in reference to FIGS. 3F-3H, 5, and 8A-8B), this allows for creation of a scheme in which authorized wireless power receivers may be detected based on the different signature signals, and unauthorized wireless power receivers may be ignored, to avoid allowing unauthorized devices to leach power from the system.

Also referencing FIG. 9B, when it is determined that only an object (which is not a wireless power receiver) is present on the surface of the first power-transfer zone, then the method 900 includes waiting for a timer to expire (918) (e.g., waiting for a period of a second or two seconds to pass) and then returning to operation 906 of FIG. 9A.

Referring back to FIG. 9A, and to allow for detecting either multiple wireless power receivers on the pad and/or to detect objects and receivers located over different power-transfer zones of the pad, the method 900 may also include repeating (906A) operations 906-912 for each power-transfer zone of the plurality of power-transfer zones.

For example, in conjunction (either at the same time as or during different, non-overlapping time periods) with the sending (906) of the plurality of test power transmission signals, the method 900 may also include sending a respective plurality of test power transmission signals by respective power-transferring elements included in each power-transfer zone of the plurality of power-transfer zones; detecting, using respective signature-signal receiving circuits included in each respective power-transfer zone of the plurality of power-transfer zones, respective amounts of reflected power at each of the plurality of power-transfer zones; and determining, for each power-transfer zone of the plurality of power-transfer zones, whether (a) a wireless power receiver or (ii) an object other than a wireless power receiver is present at a respective surface adjacent to each of the plurality of power-transfer zones.

Continuing the example, based on the respective amounts of reflected power detected at a second power-transfer zone of the plurality of power-transfer zones, the method 900 may include: determining that an object other than a wireless power receiver is present at the second power-transfer zone; and in accordance with determining that the object other than a wireless power receiver is present at the second power-transfer zone, determining whether the near-field charging pad is configured to transmit wireless power while one or more objects are present on the near-field charging pad. In embodiments in which an object other than a wireless power receiver is detected at a power-transfer zone different from a zone over which an authorized wireless power receiver is detected, the sending of the additional power transmission signals is only performed after determining that the near-field charging pad is configured to send wireless power while one or more objects are present on the near-field charging pad.

In some embodiments, the near-field charging pad is configured with a parameter that indicates whether it is allowed to send power while foreign objects (e.g., objects other than wireless power receivers) are present on the pad. For instance, an owner or operator of the pad may set this parameter during a setup procedure for the pad. In some embodiments, the classifying may also be performed in a more granular fashion, e.g., to determine types of objects that are not wireless power receivers (e.g., metallic objects, non-metallic objects, credit cards, spilled liquids, etc.).

In some embodiments, the power transmission signals discussed above are radio frequency (RF) power transmission signals (e.g., the test power transmission signals and the additional power transmission signals are RF power transmission signals).

All of these examples are non-limiting and any number of combinations and multi-layered structures are possible using the example structures described above.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of operating a near-field charging pad, comprising:

at a near-field charging pad that includes one or more processors, a power-transferring element, a signature-signal-receiving circuit, wherein the one or more processors of the near-field charging pad are in communication with a data source that includes predefined signature signals, including (i) a first predefined signature signal that identifies a wireless power receiver, (ii) a second predefined signature signal that identifies an object other than a wireless power receiver, and (iii) a third predefined signature signal that identifies a combination of a wireless power receiver and an object other than a wireless power receiver:

after sending a plurality of test radio frequency (RF) power transmission signals using the power-transferring element, detecting, using the signature-signal-receiving circuit, respective amounts of reflected power that correspond to energy from the plurality of test RF power transmission signals that was reflected outside of the near-field charging pad and returned to the near-field charging pad;

generating, using the signature-signal-receiving circuit and based on variations in the respective amounts of reflected power, a new signature signal; and based at least in part on comparing the new signature signal with the predefined signature signals, determining whether (i) an authorized wireless power receiver is present on the near-field charging pad and/or (ii) an object other than a wireless power receiver is present on the near-field charging pad.

2. The method of claim 1, further comprising:
in accordance with a determination that the authorized wireless power receiver is present on the surface: transmitting, by the power-transferring element, additional RF power transmission signals with values for a set of transmission characteristics, the values being distinct from values for the plurality of test RF power transmission signals.

3. The method of claim 2, wherein:
the comparison of the new signature signal with the predefined signature signals indicates that an object other than a wireless power receiver is present between the authorized wireless power receiver and a surface of the near-field charging pad, and
the method further comprises:
determining that the near-field charging pad is configured to send RF power transmission signals while an object other than a wireless power receiver is present on the near-field charging pad; and
after determining that the near-field charging pad is configured to send RF power transmission signals while an object other than a wireless power receiver is present on the near-field charging pad, sending the additional RF power transmission signals.

4. The method of claim 2, wherein the new signature signal is conveyed to the signature-signal-receiving circuit by encoding the new signature signal using manipulations to an impedance value of the wireless power receiver, the manipulations to the impedance value causing the amounts of reflected power to vary at different points in time.

5. The method of claim 2, further comprising:
after sending the additional RF power transmission signals, receiving a data-communication signal from the wireless power receiver, the data-communication signal including information that allows the near-field charging pad to determine device-specific values for the set of transmission characteristics; and
in response to receiving the data-communication signal, ceasing to send the additional RF power transmission signals and instead sending, via the power-transfer element, further RF power transmission signals with the device-specific values for the set of transmission characteristics.

6. The method of claim 1, wherein:
the near-field charging pad includes a data-communication radio, and
the sending of the plurality of test RF power transmission signals is performed without receiving any signal via the data-communication radio.

7. The method of claim 6, wherein the sending of the plurality of test RF power transmission signals is performed upon expiration of a predefined time period.

8. The method of claim 1, further comprising:
in conjunction with the sending of the plurality of test RF power transmission signals, sending a respective plurality of test RF power transmission signals by respective power-transferring elements included in each of a plurality of power-transfer zones;
detecting, using respective signature-signal-receiving circuits included in each respective power-transfer zone of the plurality of power-transfer zones, respective amounts of reflected power at each of the plurality of power-transfer zones; and determining, for each power-transfer zone of the plurality of power-transfer zones, whether (i) a wireless power receiver and/or (ii) an object other than a wireless power receiver is present at a respective surface adjacent to each of the plurality of power-transfer zones.

9. The method of claim 8, further comprising:
based on the respective amounts of reflected power detected at a particular power-transfer zone of the plurality of power-transfer zones, determining that an object other than a wireless power receiver is present at the particular power-transfer zone; and
in accordance with determining that the object other than a wireless power receiver is present at the particular power-transfer zone, determining whether the near-field charging pad is configured to transmit wireless RF power while one or more objects are present on the near-field charging pad,
wherein the sending of additional RF power transmission signals is only performed after determining that the near-field charging pad is configured to transmit wireless RF power while one or more objects are present on the near-field charging pad.

10. The method of claim 1, wherein the data source is populated with the predefined signature signals during a configuration process in which each of a plurality of different wireless power receivers is placed on the near-field charging pad to allow the near-field charging pad to detect and then store a respective predefined signature signal for each of the plurality of different wireless power receivers.

11. The method of claim 10, wherein the configuration process also includes placing a plurality of different objects, which are not wireless power receivers, on the near-field charging pad to allow the near-field charging pad to detect and then store a respective predefined signature signal for each of the plurality of different objects.

12. The method of claim 1, wherein the wireless power receiver comprises a power-receiving element and a rectifier coupled to the power-receiving element for converting alternating current generated by receipt of RF power transmission signals to direct current, and the wireless power receiver comprises:
impedance-modification circuitry positioned at a direct current output port of the rectifier, the impedance-modification circuitry configured to modify an impedance at the wireless power receiver.

13. A non-transitory computer-readable storage medium storing executable instructions that, when executed by a near-field charging pad that includes one or more processors, a power-transferring element, a signature-signal-receiving circuit, wherein the one or more processors of the near-field charging pad are in communication with a data source that includes predefined signature signals, including (i) a first predefined signature signal that identifies a wireless power receiver, (ii) a second predefined signature signal that identifies an object other than a wireless power receiver, and (iii) a third predefined signature signal that identifies a combination of a wireless power receiver and an object other than a wireless power receiver, cause the near-field charging pad to:
after sending a plurality of test radio frequency (RF) power transmission signals using the power-transferring element, detect, using the signature-signal-receiving circuit, respective amounts of reflected power that correspond to energy from the plurality of test RF power transmission signals that was reflected outside of the near-field charging pad and returned to the near-field charging pad;

generate, based on variations in the respective amounts of reflected power, a new signature signal; and based at least in part on comparing the new signature signal with the predefined signature signals, determine whether (i) an authorized wireless power receiver is present on the near-field charging pad and/or (ii) an object other than a wireless power receiver is present on the near-field charging pad.

14. A near-field charging pad, comprising:

a signature-signal receiving circuit;

a power-transferring element;

one or more processors, wherein the one or more processors of the near-field charging pad are in communication with a data source that includes predefined signature signals, including (i) a first predefined signature signal that identifies a wireless power receiver, (ii) a second predefined signature signal that identifies an object other than a wireless power receiver, and (iii) a third predefined signature signal that identifies a combination of a wireless power receiver and an object other than a wireless power receiver; and memory storing one or more programs that are configured for execution by the one or more processors, the one or more programs including instructions for:

after sending a plurality of test radio frequency (RF) power transmission signals using the power-transferring element, detecting, using the signature-signal-receiving circuit, respective amounts of reflected power that correspond to energy from the plurality of test RF power transmission signals that was reflected outside of the near-field charging pad and returned to the near-field charging pad;

generating, based on variations in the respective amounts of reflected power, a new signature signal; and based at least in part on comparing the new signature signal with the predefined signature signals, determining whether (i) an authorized wireless power receiver is present on the near-field charging pad and/or (ii) an object other than a wireless power receiver is present on the near-field charging pad.

15. The non-transitory computer-readable storage medium of claim 13, wherein the executable instructions, when executed by the one or more processors, further cause the near-field charging pad to:

in accordance with a determination that the authorized wireless power receiver is present on the surface:

transmit, by the power-transferring element, additional RF power transmission signals with values for a set of transmission characteristics, the values being distinct from values for the plurality of test RF power transmission signals.

16. The non-transitory computer-readable storage medium of claim 15, wherein:

the comparison of the new signature signal with the predefined signature signals indicates that an object other than a wireless power receiver is present between the authorized wireless power receiver and a surface of the near-field charging pad, and the executable instructions, when executed by the one or more processors, further cause the near-field charging pad to:

determine that the near-field charging pad is configured to send RF power transmission signals while an object other than a wireless power receiver is present on the near-field charging pad; and after determining that the near-field charging pad is configured to send RF power transmission signals while an object other than a wireless power receiver is present on the near-field charging pad, send the additional RF power transmission signals.

17. The non-transitory computer-readable storage medium of claim 15, wherein the new signature signal is conveyed to the signature-signal-receiving circuit by encoding the new signature signal using manipulations to an impedance value of the wireless power receiver, the manipulations to the impedance value causing the amounts of reflected power to vary at different points in time.

18. The non-transitory computer-readable storage medium of claim 15, wherein the executable instructions, when executed by the one or more processors, further cause the near-field charging pad to:

after sending the additional RF power transmission signals, receive a data-communication signal from the wireless power receiver, the data-communication signal including information that allows the near-field charging pad to determine device-specific values for the set of transmission characteristics; and in response to receiving the data-communication signal, cease to send the additional RF power transmission signals and instead send, via the power-transfer element, further RF power transmission signals with the device-specific values for the set of transmission characteristics.

19. The non-transitory computer-readable storage medium of claim 13, wherein:

the near-field charging pad includes a data-communication radio, and the sending of the plurality of test RF power transmission signals is performed without receiving any signal via the data-communication radio.

20. The non-transitory computer-readable storage medium of claim 19, wherein the sending of the plurality of test RF power transmission signals is performed upon expiration of a predefined time period.

21. The non-transitory computer-readable storage medium of claim 13, wherein the executable instructions, when executed by the one or more processors, further cause the near-field charging pad to:

in conjunction with the sending of the plurality of test RF power transmission signals, send a respective plurality of test RF power transmission signals by respective power-transferring elements included in each of a plurality of power-transfer zones;

detect, using respective signature-signal-receiving circuits included in each respective power-transfer zone of the plurality of power-transfer zones, respective amounts of reflected power at each of the plurality of power-transfer zones; and determine, for each power-transfer zone of the plurality of power-transfer zones, whether (i) a wireless power receiver and/or (ii) an object other than a wireless power receiver is present at a respective surface adjacent to each of the plurality of power-transfer zones.

22. The non-transitory computer-readable storage medium of claim 21, wherein the executable instructions, when executed by the one or more processors, further cause the near-field charging pad to:

based on the respective amounts of reflected power detected at a particular power-transfer zone of the plurality of power-transfer zones, determine that an object other than a wireless power receiver is present at the particular power-transfer zone; and in accordance with determining that the object other than a wireless power receiver is present at the particular power-transfer zone, determine whether the near-field charging pad is configured to transmit wireless RF power while one or more objects are present on the near-field charging pad, wherein the sending of additional RF power transmission signals is only performed after determining that the near-field charging pad is configured to transmit wireless RF power while one or more objects are present on the near-field charging pad.

23. The non-transitory computer-readable storage medium of claim 13, wherein the data source is populated with the predefined signature signals during a configuration process in which each of a plurality of different wireless power receivers is placed on the near-field charging pad to allow the near-field charging pad to detect and then store a respective predefined signature signal for each of the plurality of different wireless power receivers.

24. The non-transitory computer-readable storage medium of claim 23, wherein the configuration process also includes placing a plurality of different objects, which are not wireless power receivers, on the near-field charging pad to allow the near-field charging pad to detect and then store a respective predefined signature signal for each of the plurality of different objects.

25. The non-transitory computer-readable storage medium of claim 13, wherein the wireless power receiver comprises a power-receiving element and a rectifier coupled to the power-receiving element for converting alternating current generated by receipt of RF power transmission signals to direct current, and the wireless power receiver comprises:

impedance-modification circuitry positioned at a direct current output port of the rectifier, the impedance-modification circuitry configured to modify an impedance at the wireless power receiver.

26. The near-field charging pad of claim 14, wherein the one or more programs stored in the memory further include instructions for:

in accordance with a determination that the authorized wireless power receiver is present on the surface: transmitting, by the power-transferring element, additional RF power transmission signals with values for a set of transmission characteristics, the values being distinct from values for the plurality of test RF power transmission signals.

27. The near-field charging pad of claim 26, wherein:

the comparison of the new signature signal with the predefined signature signals indicates that an object other than a wireless power receiver is present between the authorized wireless power receiver and a surface of the near-field charging pad, and the method further comprises:
determining that the near-field charging pad is configured to send RF power transmission signals while an object other than a wireless power receiver is present on the near-field charging pad; and
after determining that the near-field charging pad is configured to send RF power transmission signals while an object other than a wireless power receiver is present on the near-field charging pad, sending the additional RF power transmission signals.

28. The near-field charging pad of claim 26, wherein the new signature signal is conveyed to the signature-signal-receiving circuit by encoding the new signature signal using manipulations to an impedance value of the wireless power receiver, the manipulations to the impedance value causing the amounts of reflected power to vary at different points in time.

29. The near-field charging pad of claim 26, wherein the one or more programs stored in the memory further include instructions for:

after sending the additional RF power transmission signals, receiving a data-communication signal from the wireless power receiver, the data-communication signal including information that allows the near-field charging pad to determine device-specific values for the set of transmission characteristics; and in response to receiving the data-communication signal, ceasing to send the additional RF power transmission signals and instead sending, via the power-transfer element, further RF power transmission signals with the device-specific values for the set of transmission characteristics.

30. The near-field charging pad of claim 14, further comprising a data-communication radio, and wherein:

the sending of the plurality of test RF power transmission signals is performed without receiving any signal via the data-communication radio.

31. The near-field charging pad of claim 30, wherein the sending of the plurality of test RF power transmission signals is performed upon expiration of a predefined time period.

32. The near-field charging pad of claim 14, wherein the one or more programs stored in the memory further include instructions for:

in conjunction with the sending of the plurality of test RF power transmission signals, sending a respective plurality of test RF power transmission signals by respective power-transferring elements included in each of a plurality of power-transfer zones;

detecting, using respective signature-signal-receiving circuits included in each respective power-transfer zone of the plurality of power-transfer zones, respective amounts of reflected power at each of the plurality of power-transfer zones; and determining, for each power-transfer zone of the plurality of power-transfer zones, whether (i) a wireless power receiver and/or (ii) an object other than a wireless power receiver is present at a respective surface adjacent to each of the plurality of power-transfer zones.

33. The near-field charging pad of claim 32, wherein the one or more programs stored in the memory further include instructions for:

based on the respective amounts of reflected power detected at a particular power-transfer zone of the plurality of power-transfer zones, determining that an object other than a wireless power receiver is present at the particular power-transfer zone; and in accordance with determining that the object other than a wireless power receiver is present at the particular power-transfer zone, determining whether the near-field charging pad is configured to transmit wireless RF power while one or more objects are present on the near-field charging pad, wherein the sending of additional RF power transmission signals is only performed after determining that the near-field charging pad is configured to transmit wireless RF power while one or more objects are present on the near-field charging pad.

34. The near-field charging pad of claim 14, wherein the data source is populated with the predefined signature signals during a configuration process in which each of a plurality of different wireless power receivers is placed on the near-field charging pad to allow the near-field charging pad to detect and then store a respective predefined signature signal for each of the plurality of different wireless power receivers.

35. The near-field charging pad of claim 34, wherein the configuration process also includes placing a plurality of different objects, which are not wireless power receivers, on the near-field charging pad to allow the near-field charging pad to detect and then store a respective predefined signature signal for each of the plurality of different objects.

36. The near-field charging pad of claim 14, wherein the wireless power receiver comprises a power-receiving element and a rectifier coupled to the power-receiving element for converting alternating current generated by receipt of RF power transmission signals to direct current, and the wireless power receiver comprises:

impedance-modification circuitry positioned at a direct current output port of the rectifier, the impedance-modification circuitry configured to modify an impedance at the wireless power receiver.

* * * * *